(12) United States Patent
Park et al.

(10) Patent No.: US 11,850,957 B2
(45) Date of Patent: Dec. 26, 2023

(54) FUEL CELL VEHICLE

(71) Applicants: Hyundai Motor Company, Seoul (KR); Kia Corporation, Seoul (KR)

(72) Inventors: Yun Kyung Park, Gyeonggi-do (KR); Seung Jun Yeon, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 261 days.

(21) Appl. No.: 17/391,649

(22) Filed: Aug. 2, 2021

(65) Prior Publication Data
US 2022/0194235 A1    Jun. 23, 2022

(30) Foreign Application Priority Data
Dec. 18, 2020  (KR) .......................... 10-2020-0178569

(51) Int. Cl.
| | | |
|---|---|---|
| *B60L 50/72* | (2019.01) | |
| *B60L 50/71* | (2019.01) | |
| *H01M 8/04858* | (2016.01) | |
| *B60L 58/30* | (2019.01) | |
| *B60R 16/023* | (2006.01) | |

(52) U.S. Cl.
CPC .............. *B60L 50/72* (2019.02); *B60L 50/71* (2019.02); *B60L 58/30* (2019.02); *B60R 16/0239* (2013.01); *H01M 8/0494* (2013.01); *H01M 2250/20* (2013.01)

(58) Field of Classification Search
CPC ........... B60L 50/71; B60L 50/72; B60L 58/30
See application file for complete search history.

(56) References Cited

U.S. PATENT DOCUMENTS

2013/0045398 A1*  2/2013  Katano ................. B60L 3/0007
                                                          429/7

FOREIGN PATENT DOCUMENTS

JP       2009190438 A  *  8/2009
KR    2020-0133887 A    12/2020

OTHER PUBLICATIONS

Miho, JP 2009-190438A Espacenet machine translation, 2009 (Year: 2009).*

* cited by examiner

*Primary Examiner* — Adam A Arciero
(74) *Attorney, Agent, or Firm* — Fox Rothschild LLP

(57) ABSTRACT

A fuel cell vehicle is provided. The fuel cell vehicle includes a fuel cell, a junction box that is disposed on the fuel cell and includes a first bus bar, a power controller that is disposed at the rear side of the fuel cell and includes a second bus bar, and a fastening part that fastens the first bus bar and the second bus bar in a fastening space to electrically connect the junction box and the power controller to each other. One of the junction box and the power controller includes a tool inlet to allow access to the fastening space from the outside.

20 Claims, 25 Drawing Sheets

ND VEHICLE

CROSS REFERENCE TO RELATED APPLICATION(S)

This application claims the benefit of Korean Patent Application No. 10-2020-0178569, filed on Dec. 18, 2020, which is hereby incorporated by reference as if fully set forth herein.

BACKGROUND

Field of the Disclosure

The present disclosure relates to a fuel cell vehicle and, more particularly, to a fuel cell vehicle that has a power controller and a junction box, which are advantageously arranged in terms of space utilization and energy transfer.

Discussion of the Related Art

In general, a vehicle including a fuel cell (hereinafter referred to as a "fuel cell vehicle") may require various levels of power from the fuel cell. If the driving voltage of the fuel cell vehicle is greater than the output voltage of the fuel cell, a high-voltage boosting-type direct-current (DC)/direct-current (DC) converter (or a fuel-cell DC/DC converter (FDC)) is required to boost the output voltage of the fuel cell. The FDC is one of the bulky components in the fuel cell vehicle. Therefore, there is need to solve a problem of an increase in the volume of the fuel cell vehicle attributable to installation of the FDC thereto. Further, since the FDC needs to be closely connected to a junction box for the process of transferring energy, the arrangement of the FDC and the junction box is important affecting fuel cell vehicles.

SUMMARY

Accordingly, exemplary embodiments are directed to a fuel cell vehicle that substantially obviates one or more problems due to limitations and disadvantages of the related art. The present disclosure provides a fuel cell vehicle that has a power controller and a junction box, which are advantageously arranged in terms of space utilization and energy transfer.

However, the objects to be accomplished by the exemplary embodiments are not limited to the above-mentioned objects, and other objects not mentioned herein will be clearly understood by those skilled in the art from the following description.

A fuel cell vehicle according to an exemplary embodiment may include a fuel cell, a junction box disposed on the fuel cell and including a first bus bar, a power controller disposed at the rear side of the fuel cell to boost the output voltage of the fuel cell, the power controller having a second bus bar, and a fastening part configured to fasten the first bus bar and the second bus bar in a fastening space to electrically connect the junction box and the power controller to each other. One of the junction box and the power controller may include a tool inlet to allow access to the fastening space from the outside.

For example, the fastening part may include a fastening member configured to directly fasten the first bus bar and the second bus bar. For example, the fastening member may include screw parts passing through the first bus bar and the second bus bar in a fastening direction to be threaded with the first bus bar and the second bus bar, respectively.

The fastening part may include a terminal block having a terminal bus bar including a first end portion, connected to the first bus bar, and a second end portion, connected to the second bus bar, a first fastening member configured to directly fasten the first bus bar and the first end portion of the terminal bus bar, and a second fastening member configured to directly fasten the second bus bar and the second end portion of the terminal bus bar.

The first fastening member may include a first screw part passing through the first bus bar and the first end portion of the terminal bus bar in the fastening direction to be threaded with the first bus bar and the first end portion of the terminal bus bar, and the second fastening member may include a second screw part passing through the second bus bar and the second end portion of the terminal bus bar in the fastening direction to be threaded with the second bus bar and the second end portion of the terminal bus bar.

The tool inlet may overlap the fastening space in the fastening direction. The junction box may include the fastening space and the tool inlet, the second bus bar may protrude from the power controller to the inside of the junction box, and the terminal block may be connected to the power controller and may protrude to the inside of the junction box.

The fastening space may overlap the power controller in a vertical direction. The junction box may be configured to be openable and closable to form the tool inlet, and may include a first main cover overlapping the fastening space in the fastening direction. The first main cover may include a first cover portion, overlapping the fuel cell in the vertical direction, and a second cover portion, overlapping the fastening space in the vertical direction.

Additionally, the first cover portion and the second cover portion may be integrally formed to be opened and closed together. For example, the first cover portion and the second cover portion may be formed to be opened and closed separately from each other. The fuel cell vehicle may further include a first sealing member disposed at a contact portion between the junction box and the power controller.

The fuel cell vehicle may further include a first annular cover having a first hollow portion that overlaps the tool inlet in the junction box in the fastening direction. The first annular cover may be disposed on a side portion of the junction box. The first hollow portion and the tool inlet may communicate with each other to expose the fastening space. Additionally, the fuel cell vehicle may include a second sealing member disposed at a contact portion between the first annular cover and the side portion of the junction box to surround the first hollow portion.

Further, the power controller may include the fastening space and the tool inlet, the first bus bar may protrude from the junction box to the inside of the power controller, and the terminal block may be connected to the junction box and may protrude to the inside of the power controller. The fastening space may overlap the junction box in a horizontal direction. For example, the power controller may be opened and closed to form the tool inlet, and may include a second main cover overlapping the fastening space in the fastening direction.

The second main cover may include a third cover portion, that overlaps the fuel cell in the horizontal direction, and a fourth cover portion, that overlaps the fastening space in the horizontal direction. For example, the third cover portion and the fourth cover portion may be integrally formed to be opened and closed together. The third cover portion and the fourth cover portion may be formed to be opened and closed separately from each other.

The fuel cell vehicle may further include a third sealing member disposed at a contact portion between the junction box and the power controller. In addition, the fuel cell vehicle may include a second annular cover having a second hollow portion that overlaps the tool inlet in the power controller in the fastening direction. The second annular cover may be disposed on a side portion of the power controller. The second hollow portion and the tool inlet may communicate with each other to expose the fastening space. The fuel cell vehicle may further include a fourth sealing member disposed at a contact portion between the second annular cover and the side portion of the power controller to surround the second hollow portion.

BRIEF DESCRIPTION OF THE DRAWINGS

Arrangements and exemplary embodiments may be described in detail with reference to the following drawings, in which like reference numerals refer to like elements and wherein.

DETAILED DESCRIPTION OF THE INVENTION

Figure 1:
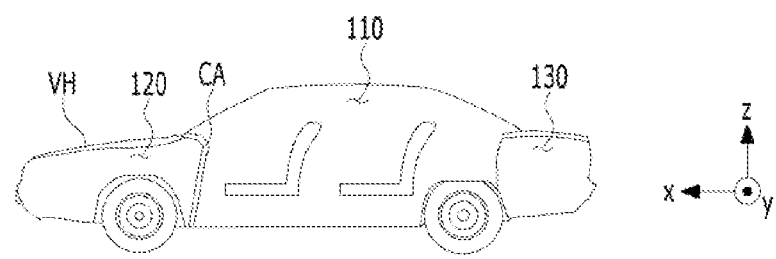
FIG. 1 is a view showing the external appearance of a general fuel cell vehicle.

The present disclosure will now be described more fully hereinafter with reference to the accompanying drawings, in which various exemplary embodiments are shown. The examples, however, may be embodied in many different forms, and should not be construed as being limited to the exemplary embodiments set forth herein. Rather, these embodiments are provided so that this disclosure will be more thorough and complete, and will more fully convey the scope of the disclosure to those skilled in the art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It will be understood that when an element is referred to as being "on" or "under" another element, it may be directly on/under the element, or one or more intervening elements may also be present. When an element is referred to as being "on" or "under", "under the element" as well as "on the element" may be included based on the element. In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, fuel cell vehicles 200A, 200B, 200C, 200D and 200E according to exemplary embodiments will be described with reference to the accompanying drawings. The fuel cell vehicles 200A, 200B, 200C, 200D and 200E will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the exemplary embodiments are not limited thereto. In other words, the x-axis, the y-axis, and the z-axis may intersect each other obliquely. For convenience of description, at least one of the x-axis or the y-axis will be referred to as a "horizontal direction", and the z-axis will be referred to as a "vertical direction".

FIG. 1 is a view showing the external appearance of a general fuel cell vehicle. Referring to FIG. 1, a vehicle including a fuel cell (hereinafter referred to as a "fuel cell vehicle") may include an occupant compartment 110, in which occupants are accommodated, a first space 120, which is located in front of the occupant compartment 110, and a second space 130, which is located behind the occupant compartment 110. For example, when the vehicle travels in the x-axis direction, the first space 120 may correspond to an engine compartment, in which the engine of the fuel cell vehicle is accommodated, and the second space 130 may correspond to a trunk.

FIGS. 2A to 2E are views showing fuel cell vehicles 200A to 200E according to exemplary embodiments. Each of the fuel cell vehicles 200A to 200E according to the exemplary embodiments shown in FIGS. 2A to 2E may include a fuel cell 210, a junction box (or a high-voltage junction box) 220, a power controller 230, and a fastening part, which is located in a fastening space 240. The fuel cell 210 may include a plurality of unit fuel cells, which are stacked in at least one of the vertical direction or the horizontal direction. For example, the fuel cell 210 may include a plurality of unit fuel cells, which are stacked in at least one of the x-axis direction, the y-axis direction, or the z-axis direction.

Hereinafter, each of the fuel cell vehicles 200A to 200E according to the exemplary embodiments shown in FIGS. 2A to 2E will be described as including one unit fuel cell, but the following description may also apply to the case in which each of the fuel cell vehicles 200A to 200E according to the exemplary embodiments includes a plurality of unit fuel cells. The unit fuel cell may be a polymer electrolyte membrane fuel cell (or a proton exchange membrane fuel cell) (PEMFC), which has been studied most extensively as a power source for driving vehicles. However, the exemplary embodiment is not limited to any specific configuration or external appearance of the unit fuel cell.

The unit fuel cell included in the fuel cell 210 may include end plates (or pressing plates or compression plates) (not shown), current collectors (not shown), and a cell stack (not shown). The cell stack may include a plurality of unit cells, which are stacked in the horizontal direction (e.g. the x-axis direction or the y-axis direction). Several tens to several hundreds of unit cells, e.g. 100 to 400 unit cells, may be stacked to form the cell stack.

Each unit cell may generate about 0.6 volts to 1.0 volts of electricity, on average 0.7 volts of electricity. Thus, the number of unit fuel cells included in the fuel cell 210 and the number of unit cells included in the cell stack of the unit fuel cell may be determined in accordance with the intensity of the power to be supplied from the fuel cell 210 to a load. Here, "load" may refer to a part of each of the fuel cell vehicles 200A to 200E that requires power. The end plates may be disposed at respective ends of the cell stack, and may support and fix the plurality of unit cells. In other words, the first end plate may be disposed at a first end of the two ends of the cell stack, and the second end plate may be disposed at a second end of the two ends of the cell stack.

In addition, the fuel cell 210 may further include a clamping member (not shown), which has a bar shape, a long bolt shape, a belt shape, or a rigid rope shape to clamp the plurality of unit cells. For example, in each unit fuel cell, the clamping member may clamp the plurality of unit cells together with the end plates in the horizontal direction.

The junction box 220 may be disposed on the fuel cell 210. The junction box 220 may be configured to distribute the power generated in the cell stack of the fuel cell 210. For example, the junction box 220 may include fuses (not shown) and relays (not shown) to operate peripheral auxiliary components (balance-of-plant (BOP)) assisting in the operation of the fuel cell 210. The junction box 220 may include a first body B1 and a first main cover C1. The first body B1 may accommodate fuses and relays. Accordingly, the first body B1 forms a space together with the first main cover C1, in which the fuses and the relays are accommodated. The first main cover C1 may be detachably disposed on at least one of the upper portion or the side portion of the first body B1.

The power controller 230 may be disposed between the fuel cell 210 and the occupant compartment 110, i.e. at the rear side of the fuel cell 210, to boost the output voltage of the fuel cell 210. For example, the power controller 230 may include a high-voltage boosting-type direct-current (DC)/direct-current (DC) converter (or a fuel-cell DC/DC converter (FDC)).

According to the exemplary embodiment, the accommodation space in which the fuel cell 210, the junction box 220, the power controller 230, and the fastening part are accommodated may be at least one of the first space 120 or the second space 130 shown in FIG. 1. Hereinafter, the accommodation space will be described as being the first space 120, which is located in front of the occupant compartment 110, i.e. the engine compartment. However, in some exemplary embodiments, the accommodation space may be the second space 130, or may be split into the first and second spaces 120 and 130.

In each of the fuel cell vehicles 200A to 200E according to the exemplary embodiments, the fastening part serves to electrically connect the junction box 220 and the power controller 230 to each other in the fastening space 240. Accordingly, the junction box 220 may include a first bus bar, and the power controller 230 may include a second bus bar. For example, the voltage generated by the fuel cell 210 may be transferred to the power controller 230 via the junction box 210 and boosted, and the boosted voltage may be transferred to the junction box 210. The junction box 210 may be configured to transfer the boosted voltage to the load of the fuel cell vehicle. Therefore, the junction box 220 and the power controller 230 may be electrically connected to each other.

In addition, each of the fuel cell vehicles 200A to 200E according to the exemplary embodiments may further include a tool inlet, which allows a tool (or a user) to access the fastening space 240 from the outside to manipulate the fastening part to fasten the first bus bar and the second bus bar. The tool inlet may be included in one of the junction box 220 and the power controller 230. In each of the fuel cell vehicles 200A, 200B and 200C shown in FIGS. 2A to 2C, the tool inlet may be located in the junction box 220. In each of the fuel cell vehicles 200D and 200E shown in FIGS. 2D and 2E, the tool inlet may be located in the power controller 230.

In each of the fuel cell vehicles 200A to 200E shown in FIGS. 2A to 2E, the tool inlet may overlap the fastening space 240 in the fastening direction. The fastening part may fasten the first bus bar to the second bus bar in the fastening space 240 to electrically connect the junction box 220 and the power controller 230 to each other. According to the fuel cell vehicle according to the exemplary embodiment, the fastening space 240 may be located in any of various places, and the fastening part may fasten the first bus bar to the second bus bar in any of various ways in the fastening space 240.

Hereinafter, various exemplary embodiments of the fuel cell vehicle according to the exemplary embodiment will be described with reference to the accompanying drawings. The fastening part may directly connect the first bus bar and the second bus bar, or may indirectly connect the first bus bar and the second bus bar via a terminal block. In each of the fuel cell vehicles 200A, 200B and 200C shown in FIGS. 2A to 2C, the terminal block connected to the power controller 230 may protrude to the inside of the junction box 220. In contrast, in each of the fuel cell vehicles 200D and 200E shown in FIGS. 2D and 2E, the terminal block connected to the junction box 220 may protrude to the inside of the power controller 230.

Figure 2A:
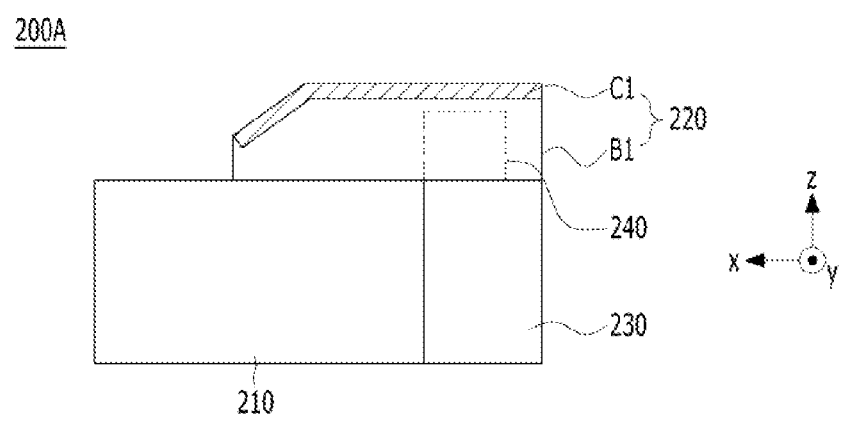
FIGS. 2A to 2E are views showing fuel cell vehicles according to exemplary embodiments.
Figure 2B:
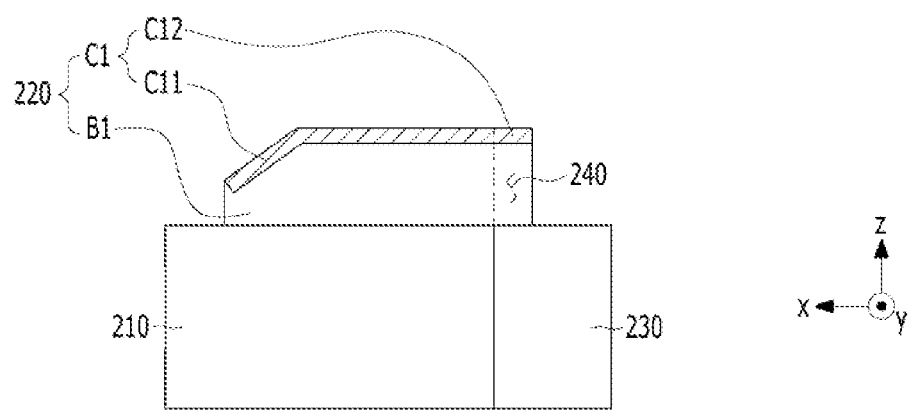
Figure 2C:
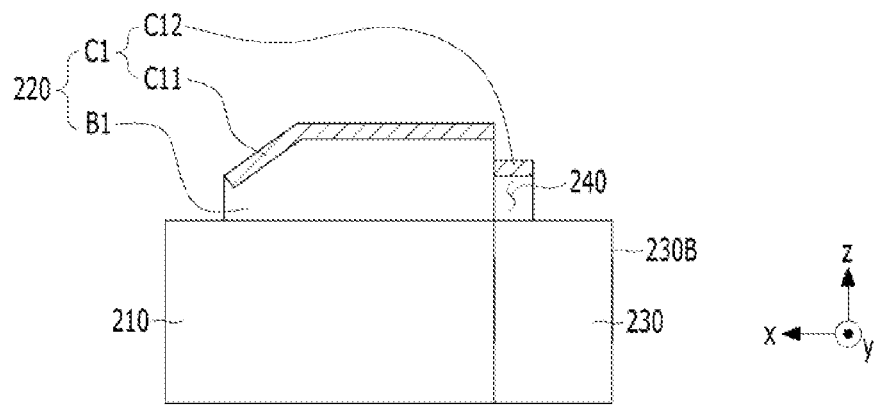

According to an exemplary embodiment, in each of the fuel cell vehicles 200A to 200C shown in FIGS. 2A to 2C, the fastening space 240 may be located inside the junction box 220, the second bus bar may protrude from the power controller 230 to the inside of the junction box 220, and the fastening space 240 may overlap the power controller 230 in the vertical direction. In the fuel cell vehicle 200A shown in FIG. 2A, a portion of the junction box 220 including the fastening space 240 overlaps the power controller 230 in the vertical direction. In the fuel cell vehicle 200B shown in FIG. 2B, only the fastening space 240 overlaps the power controller 230 in the vertical direction.

Figure 2D:
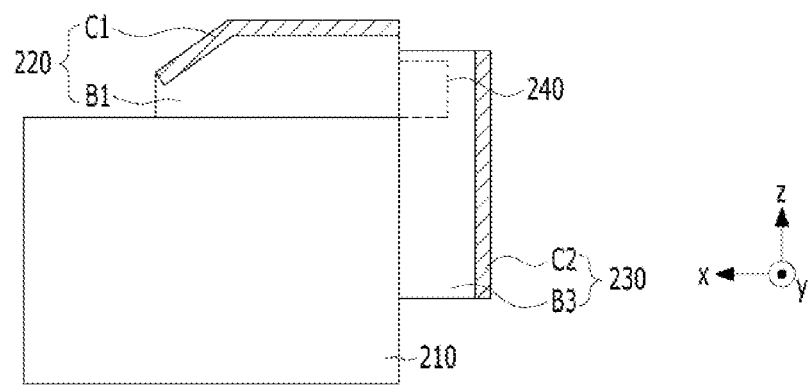
Figure 2E:
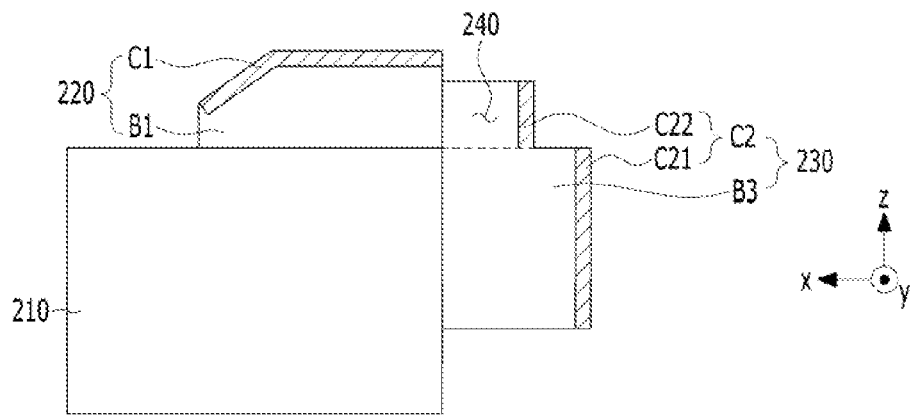

According to another exemplary embodiment, in each of the fuel cell vehicles 200D and 200E shown in FIGS. 2D and 2E, the fastening space 240 may be located inside the power controller 230, the first bus bar may protrude from the junction box 220 to the inside of the power controller 230, and the fastening space 240 may overlap the junction box 220 in the horizontal direction.

First, exemplary embodiments of the fuel cell vehicles 200A to 200C shown in FIGS. 2A to 2C will be described below. FIGS. 3A to 3D are views showing an exemplary embodiment of the fuel cell vehicle 200A shown in FIG. 2A, and FIG. 3E is a view showing an exemplary embodiment of the fuel cell vehicle 200B shown in FIG. 2B.

Figure 3A:
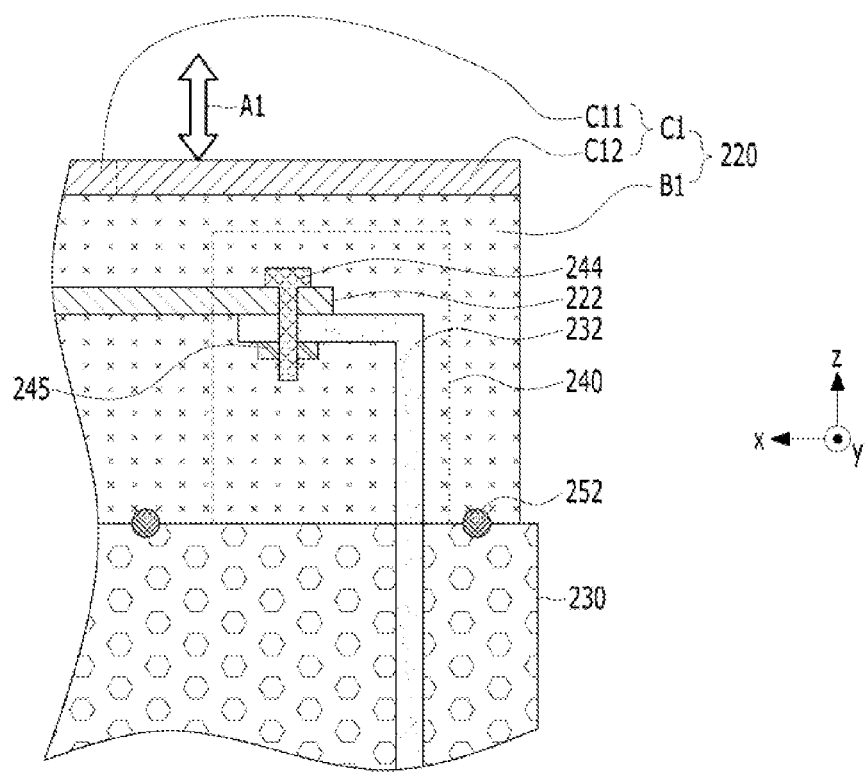
FIGS. 3A to 3D are views showing an exemplary embodiment of the fuel cell vehicle shown in FIG. 2A.
Figure 3B:
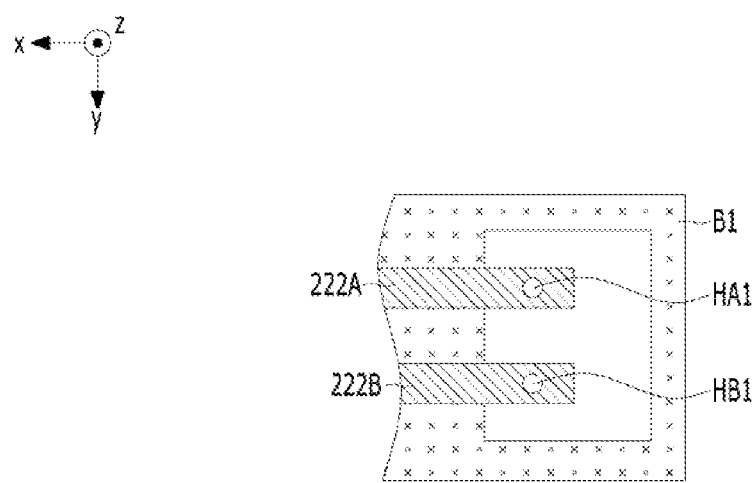
Figure 3C:
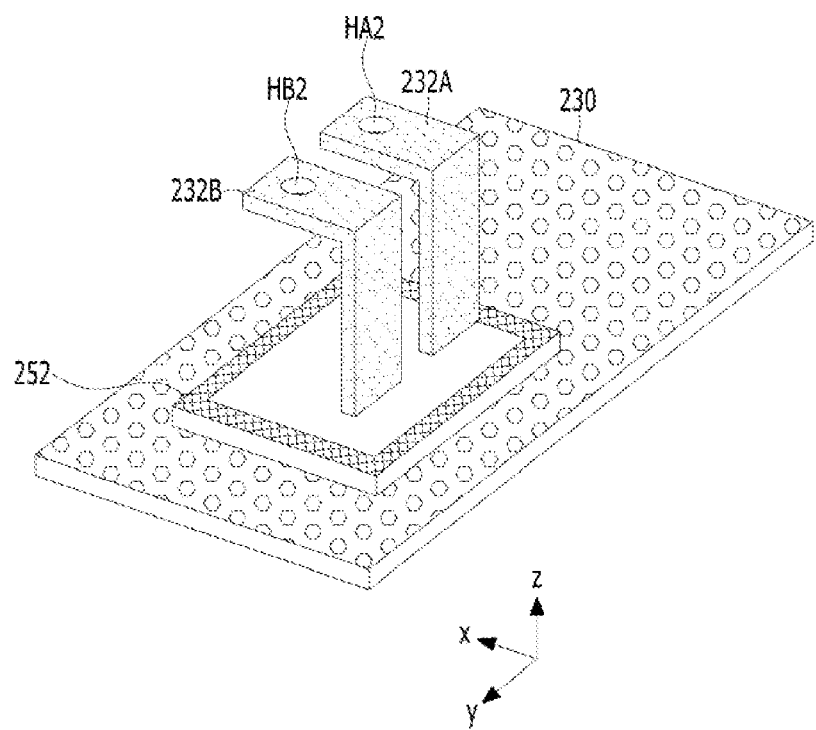
Figure 3D:
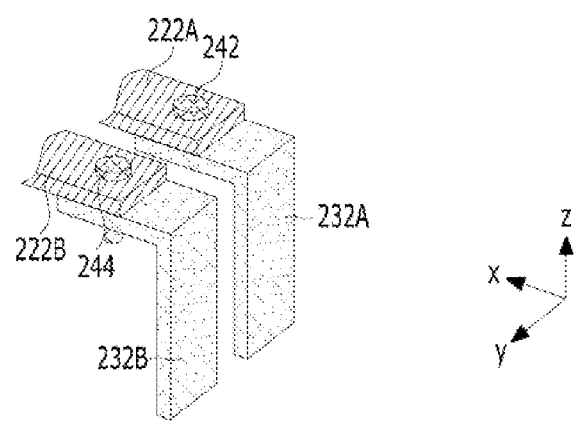
Figure 3E:
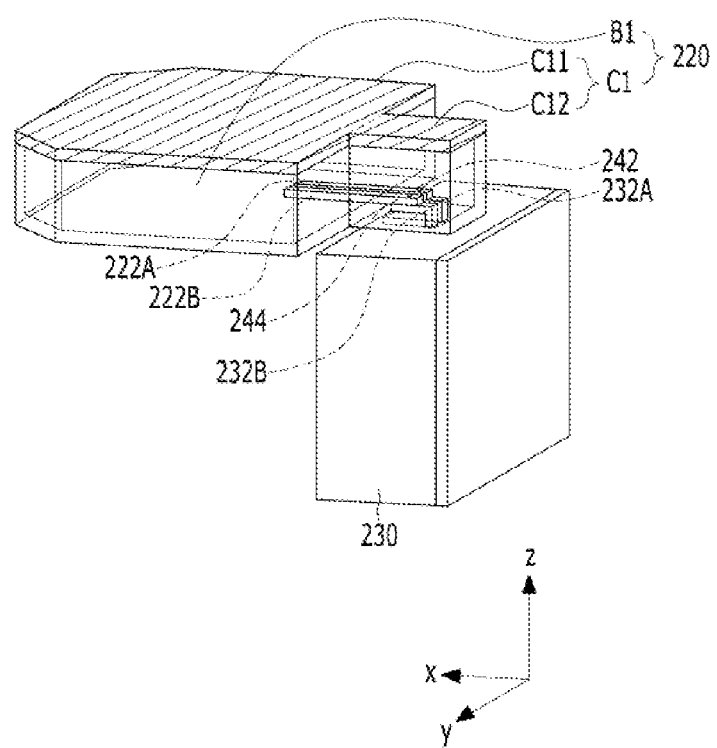
FIG. 3E is a view showing an embodiment of the fuel cell vehicle shown in FIG. 2B.

FIG. 3A is a cross-sectional view of the fuel cell vehicle, FIG. 3B is a plan view of a part of the fuel cell vehicle shown in FIG. 3A, FIG. 3C is a partial perspective view of another part of the fuel cell vehicle shown in FIG. 3A, FIG. 3D is a partial perspective view of a part of the fuel cell vehicle shown in FIGS. 3A and 3C, and FIG. 3E is a perspective view of the fuel cell vehicle 200B shown in FIG. 2B, from which the fuel cell 210 is excluded.

The first bus bar 222 shown in FIG. 3A, as illustrated in FIGS. 3B, 3D and 3E, may include a 1-$1^{st}$ bus bar 222A, which corresponds to a positive terminal, and a 1-$2^{nd}$ bus bar 222B, which corresponds to a negative terminal. The second bus bar 232 shown in FIG. 3A, as illustrated in FIGS. 3C, 3D and 3E, may include a 2-$1^{st}$ bus bar 232A, which corresponds to a positive terminal, and a 2-$2^{nd}$ bus bar 232B, which corresponds to a negative terminal.

The fastening part may include a fastening member for directly fastening the first bus bar 222 (222A and 222B) and the second bus bar 232 (232A and 232B). Accordingly, as shown in FIGS. 3A, 3D and 3E, the fastening member may include first and second screw parts 242 and 244. The first screw part 242 may fasten the 1-$1^{st}$ bus bar 222A and the 2-$1^{st}$ bus bar 232A, and the second screw part 244 may fasten the 1-$2^{nd}$ bus bar 222B and the 2-$2^{nd}$ bus bar 232B. Accordingly, the 1-$1^{st}$ bus bar 222A may include a first through-hole HA1, the 1-$2^{nd}$ bus bar 222B may include a second through-hole HB1, the 2-$1^{st}$ bus bar 232A may include a third through-hole HA2, and the 2-$2^{nd}$ bus bar 232B may include a fourth through-hole HB2.

In particular, the first screw part 242 passes through the first and third through-holes HA1 and HA2 in the fastening direction (e.g. the z-axis direction, that is, the vertical direction) to be threaded with the 1-$1^{st}$ bus bar 222A and the 2-$1^{st}$ bus bar 232A, thereby fastening the 1-$1^{st}$ bus bar 222A and the 2-$1^{st}$ bus bar 232A. Similarly, the second screw part 244 passes through the second and fourth through-holes HB1 and HB2 in the fastening direction (e.g. the z-axis direction, that is, the vertical direction) to be threaded with the 1-$2^{nd}$ bus bar 222B and the 2-$2^{nd}$ bus bar 232B, thereby fastening the 1-$2^{nd}$ bus bar 222B and the 2-$2^{nd}$ bus bar 232B.

The first and second screw parts 242 and 244 may include male threads formed on the outer circumferential surfaces thereof, which come into contact with the first to fourth through-holes HA1, HB1, HA2 and HB2, and the first to fourth through-holes HA1, HB1, HA2 and HB2 may include female threads formed on the inner circumferential surfaces thereof, which come into contact with the first and second screw parts 242 and 244, to mesh with the male threads of the first and second screw parts 242 and 244.

In addition, to increase ease of assembly, as shown in FIG. 3A, each of the first and second screw parts 242 and 244 may be engaged with a press-fit-type nut 245. The first main cover C1 of the junction box 220 may be opened and close, and forms the tool inlet when opened. The first main cover C1 may overlap the fastening space 240 in the fastening direction. Referring to FIGS. 3A and 3E, the first main cover C1 may include a first cover portion C11 and a second cover portion C12. The first cover portion C11 may overlap the fuel cell 210 in the vertical direction, and the second cover portion C12 may overlap the fastening space 240 in the vertical direction.

When the openable/closable second cover portion C12 of the first main cover C1 is opened in the direction of the arrow A1, the tool inlet may be opened to allow a tool (or a user) to access the fastening space 240 in the fuel cell vehicle from the outside to manipulate the first and second screw parts 242 and 244, which are fastening members, to fasten the first bus bars 222A and 222B and the second bus bars 232A and 232B. According to an exemplary embodiment, as shown in FIGS. 3A and 3E, the first cover portion C11 and the second cover portion C12 may be integrally formed to be opened and closed together.

Figure 4A:
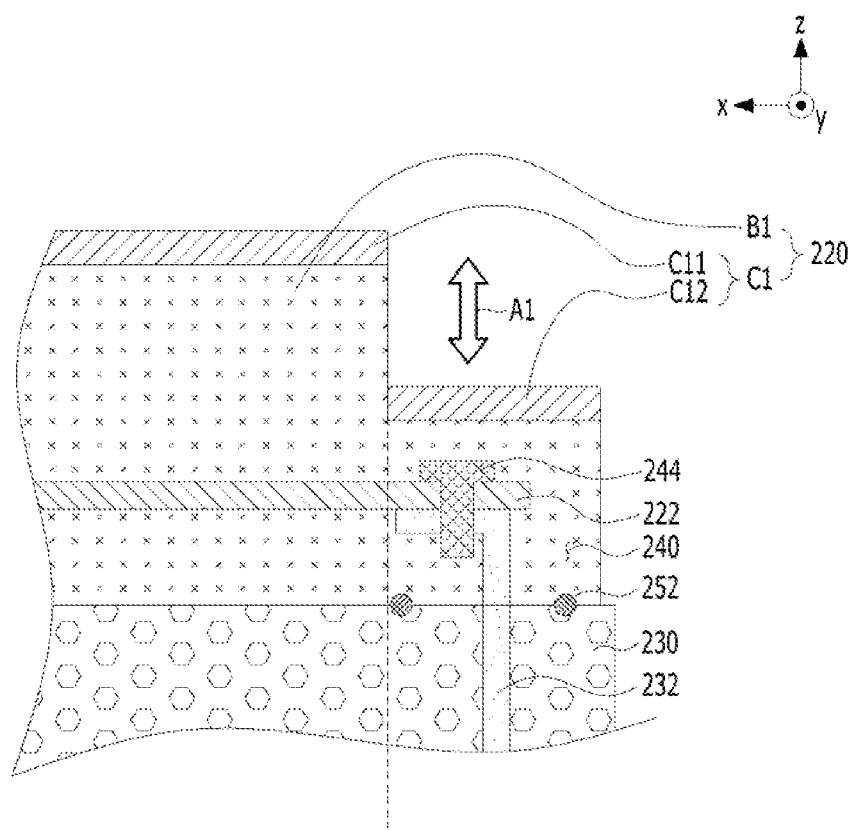
FIGS. 4A and 4B are views showing an exemplary embodiment of the fuel cell vehicle shown in FIG. 2C.
Figure 4B:
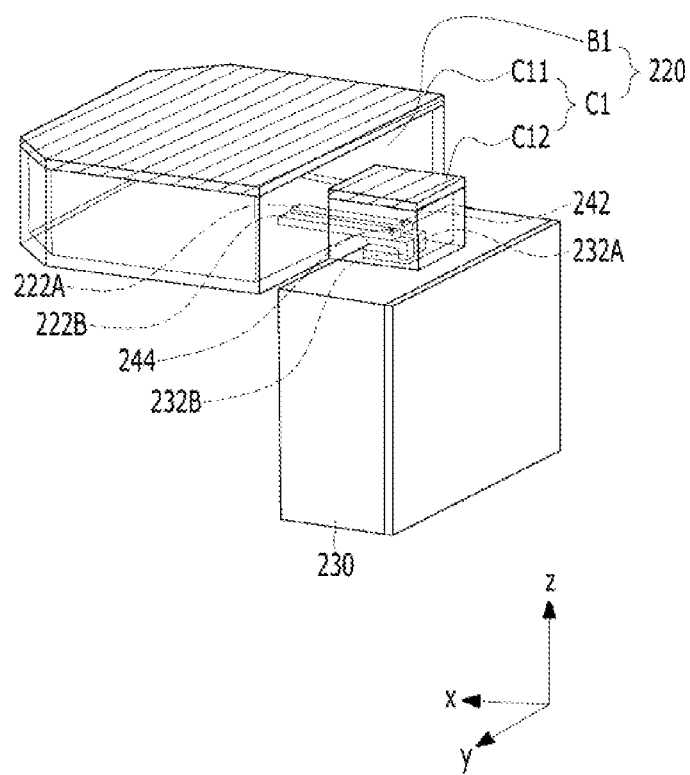

FIGS. 4A and 4B show an exemplary embodiment of the fuel cell vehicle 200C shown in FIG. 2C. FIG. 4A is a cross-sectional view of the fuel cell vehicle, and FIG. 4B is a perspective view of the fuel cell vehicle 200C shown in FIG. 2C, from which the fuel cell 210 is excluded.

In the fuel cell vehicle shown in FIGS. 3A and 3E, the top surface of the first cover portion C11 of the first main cover C1 and the top surface of the second cover portion C12 of the first main cover C1 are located in the same horizontal plane. However, in the fuel cell vehicle shown in FIGS. 4A and 4B, the top surface of the first cover portion C11 of the first main cover C1 and the top surface of the second cover portion C12 of the first main cover C1 are not located in the same horizontal plane. With this exception, since the fuel cell vehicle shown in FIGS. 4A and 4B is the same as the fuel cell vehicle shown in FIG. 3E, the same parts are denoted by the same reference numerals, and a duplicate description thereof will be omitted.

Unlike what is shown in FIGS. 3A and 3E, the first cover portion C11 and the second cover portion C12 shown in FIGS. 4A and 4B may be opened and closed separately from each other. In other words, when the second cover portion C12 is opened in the direction of the arrow A1, the first cover portion C11 may not be opened. In the fuel cell vehicle shown in FIGS. 4A and 4B, when the openable/closable second cover portion C12 of the first main cover C1 is opened in the direction of the arrow A1, the tool inlet may be opened to allow a tool (or a user) to access the fastening space 240 from the outside. For example, the tool inlet may be opened to enable fastening of the first bus bars 222A and 222B and the second bus bars 232A and 232B or to enable confirmation of the fastened state of the first bus bars 222A and 222B and the second bus bars 232A and 232B.

Figure 5A:
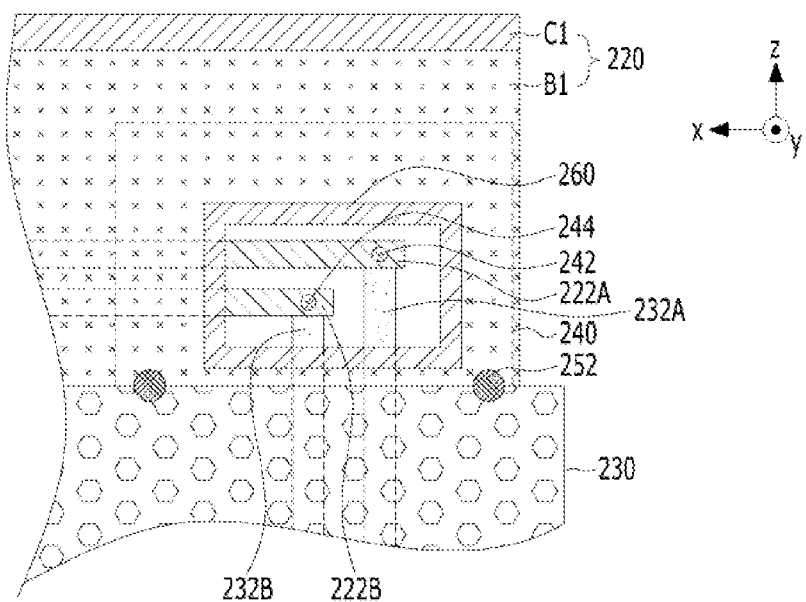
FIGS. 5A to 5C are views showing another exemplary embodiment of the fuel cell vehicles shown in FIGS. 2A and 2B.
Figure 5B:
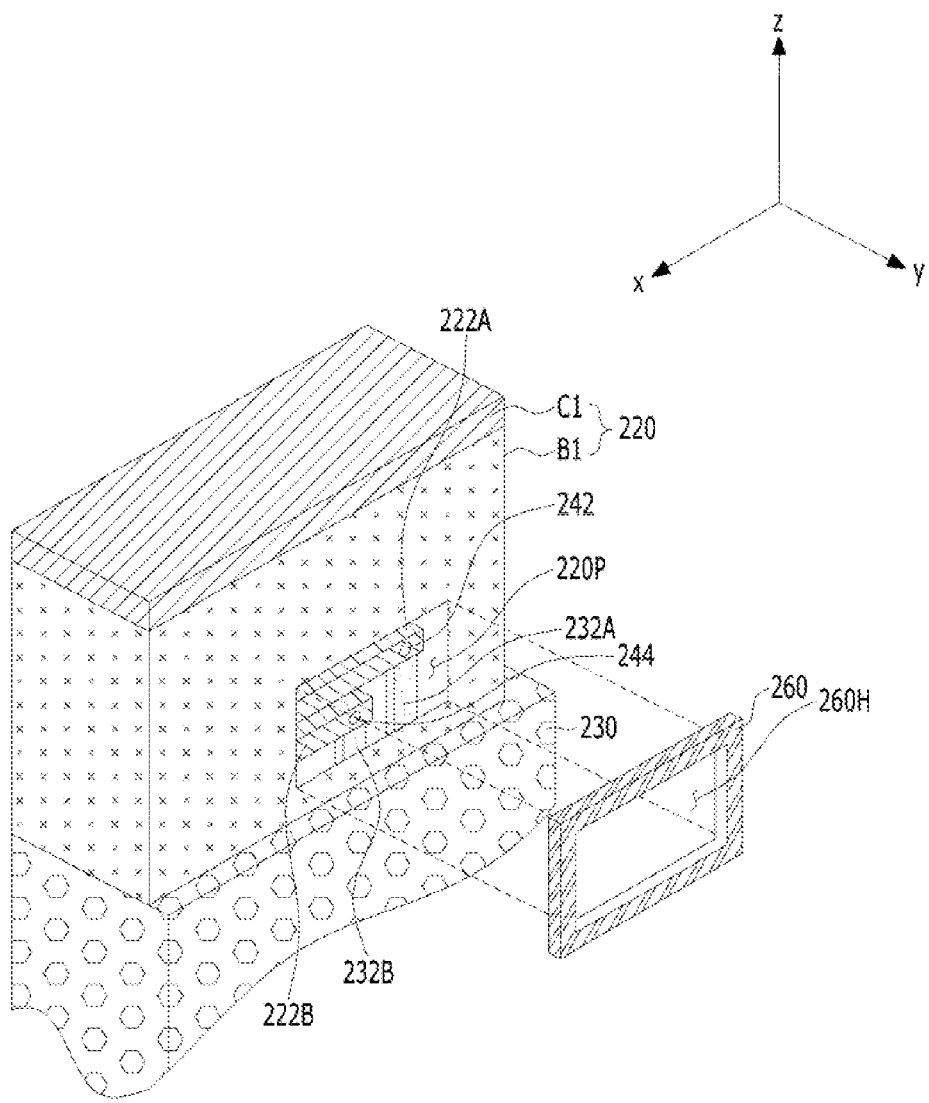
Figure 5C:
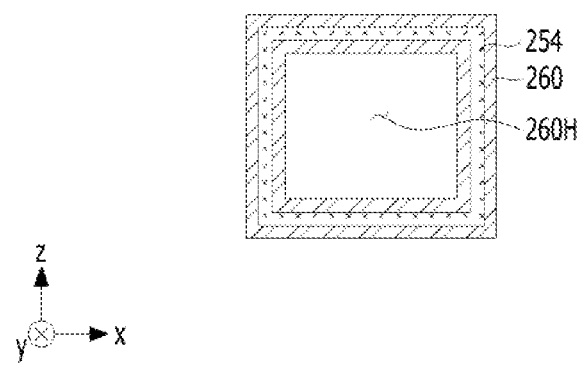

FIGS. 5A to 5C are views showing another exemplary embodiment of the fuel cell vehicles 200A and 200B shown in FIGS. 2A and 2B. Specifically, FIG. 5A is a cross-sectional view of the fuel cell vehicle, FIG. 5B is an exploded perspective view of the fuel cell vehicle, and FIG. 5C is a rear view of a first annular cover 260.

The fuel cell vehicle shown in FIGS. 5A and 5B may include a fuel cell 210, a junction box 220, and a power controller 230, and may further include a first annular cover 260. Each of the fuel cell vehicles shown in FIGS. 3A to 3E and in FIGS. 4A and 4B does not include a first annular cover 260, whereas the fuel cell vehicle shown in FIGS. 5A to 5C includes a first annular cover 260. Further, the fastening direction in each of the fuel cell vehicles shown in FIGS. 3A to 3E and in FIGS. 4A and 4B is different from the fastening direction in the fuel cell vehicle shown in FIGS. 5A to 5C. With this exception, since the fuel cell vehicle shown in FIG. 5A is the same as the fuel cell vehicle shown in FIG. 3A, the same parts are denoted by the same reference numerals, a duplicate description thereof will be omitted, and only parts that differ therebetween will be explained.

The first annular cover 260 may have a first hollow portion 260H, which overlaps the tool inlet 220P in the junction box 220 in the fastening direction, and may be disposed on the side portion of the junction box 220. In particular, the first hollow portion 260H in the first annular cover 260 and the tool inlet 220P in the junction box 220 may communicate with each other to expose the fastening space 240 to the outside.

In each of the fuel cell vehicles shown in FIGS. 3A to 3E and in FIGS. 4A and 4B, the second cover C12 may be opened in the direction of the arrow A1 to open the tool inlet, thereby allowing access by a user (or a tool) to the fastening space 240 from the outside. In contrast, in the fuel cell vehicle shown in FIG. 5A, the fastening space 240 is exposed to the outside by communication between the tool inlet 220P and the first hollow portion 260H, thereby allowing access by a user (or a tool) to the fastening space 240 from the outside. In other words, it is possible to enable access to the fastening space 240 from the outside without opening the second cover C12.

In the fuel cell vehicles shown in FIGS. 3A to 3E and in FIGS. 4A and 4B, a tool may access the fastening space 240 through the tool inlet. In contrast, in the fuel cell vehicle shown in FIG. 5A, a user may access the fastening space 240 through the tool inlet. In other words, a user is capable of manipulating the fastening part in place of a tool to fasten the first bus bars 222A and 222B and the second bus bars 232A and 232B.

In each of the fuel cell vehicles shown in FIGS. 3A to 3E and in FIGS. 4A and 4B, since the fastening members 242 and 244 fasten the first bus bars 222A and 222B and the second bus bars 232A and 232B in the z-axis direction, the fastening direction is the z-axis direction. In contrast, in the fuel cell vehicle shown in FIGS. 5A and 5B, since the fastening members 242 and 244 fasten the first bus bars 222A and 222B and the second bus bars 232A and 232B in the y-axis direction, the fastening direction is the y-axis direction.

Each of the fuel cell vehicles shown in FIGS. 3A to 3E and in FIGS. 4A and 4B may include a first sealing member 252. The first sealing member 252 may be disposed at a contact portion between the junction box 220 and the power controller 230. For example, as shown in FIG. 3C, the first sealing member 252 may have an annular shape, and may be disposed at a contact portion between the junction box 220 and the power controller 230, thereby sealing the junction box 220 and the power controller 230, which are coupled to each other, from the outside.

Unlike the fuel cell vehicles shown in FIGS. 3A to 3E and in FIGS. 4A and 4B, the fuel cell vehicle shown in FIGS. 5A to 5C may include a first sealing member 252 and a second sealing member 254. Referring to FIG. 5C, the second sealing member 254 may be disposed at a contact portion between the first annular cover 260 and the side portion of the junction box 220 to surround the first hollow portion 260H. For example, as shown in FIG. 5C, the second sealing member 254 may have an annular shape, and may be disposed at a contact portion between the junction box 220 and the first annular cover 260, thereby sealing the junction box 220 and the first annular cover 260, which are coupled to each other, from the outside.

In each of the fuel cell vehicles shown in FIGS. 3A to 3E and in FIGS. 4A and 4B, the fastening members 242 and 244 directly fasten the first bus bars 222A and 222B and the second bus bars 232A and 232B. However, according to another exemplary embodiment, the fastening members may indirectly fasten the first bus bars 222A and 222B and the second bus bars 232A and 232B via a terminal block. A fuel cell vehicle according to this exemplary embodiment will be described below with reference to the accompanying drawings.

Figure 6:
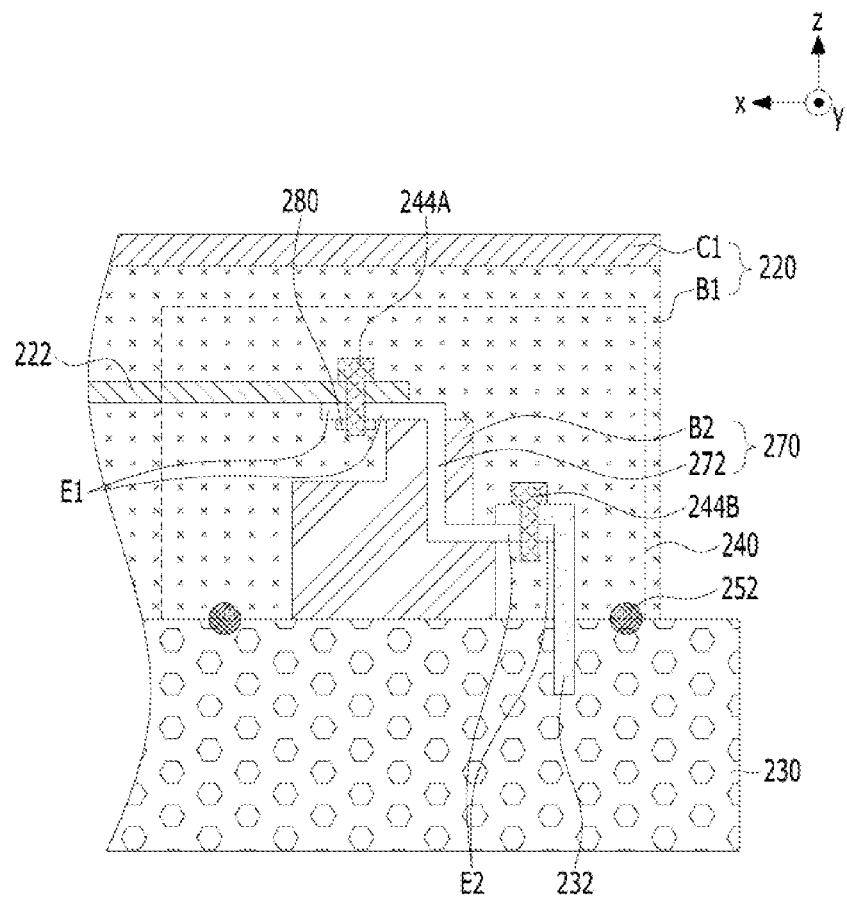
FIG. 6 is a cross-sectional view showing still another exemplary embodiment of the fuel cell vehicles shown in FIGS. 2A and 2B.

FIG. 6 is a cross-sectional view showing still another exemplary embodiment of the fuel cell vehicles 200A and 200B shown in FIGS. 2A and 2B. The fastening part of the fuel cell vehicle shown in FIG. 6 may include a terminal block 270, a first fastening member, and a second fastening member.

Unlike the fuel cell vehicle shown in FIG. 3A, the fastening part of the fuel cell vehicle shown in FIG. 6 may further include a terminal block 270. With this exception, since the fuel cell vehicle shown in FIG. 6 is the same as the fuel cell vehicle shown in FIG. 3A, the same parts are denoted by the same reference numerals, a duplicate description thereof will be omitted, and only parts that differ therebetween will be explained.

The terminal block 270 may be connected to the power controller 230, and may protrude from the power controller 230 toward the junction box 220 in the vertical direction. The terminal block 270 may include a second body B2 and a terminal bus bar 272. The second body B2 may be made of an insulating material. At least a portion of the terminal bus bar 272 may be embedded in the second body B2. The terminal bus bar 272 may include first and second end portions E1 and E2. The first end portion E1 of the terminal bus bar 272 may be connected to the first bus bar 222, and the second end portion E2 thereof may be connected to the second bus bar 232. Although not seen in the cross-sectional view of FIG. 6, the first bus bar 222 shown in FIG. 6 may include $1\text{-}1^{st}$ and $1\text{-}2^{nd}$ bus bars 222A and 222B, and the second bus bar 232 shown in FIG. 6 may include $2\text{-}1^{st}$ and $2\text{-}2^{nd}$ bus bars 232A and 232B, as shown in FIGS. 3A to 3D.

The first fastening member may directly fasten the first bus bar 222 and the first end portion E1 of the terminal bus bar 272, and the second fastening member may directly fasten the second bus bar 232 and the second end portion E2 of the terminal bus bar 272. For example, the first fastening member may include a first screw part 244A, and the second fastening member may include a second screw part 244B. The first screw part 244A may pass through the first bus bar 222 and the first end portion E1 of the terminal bus bar 272 in the fastening direction (e.g. the z-axis direction, that is, the vertical direction) to be threaded with the first bus bar 222 and the first end portion E1 of the terminal bus bar 272.

The second screw part 244B may pass through the second bus bar 232 and the second end portion E2 of the terminal bus bar 272 in the fastening direction (e.g. the z-axis direction, that is, the vertical direction) to be threaded with the second bus bar 232 and the second end portion E2 of the terminal bus bar 272. In the same method as the method in which the first and second screw parts 242 and 244 shown in FIG. 3D fasten the first bus bars 222A and 222B and the second bus bars 232A and 232B in a screw-coupling manner, the first screw part 244A may fasten the first bus bar 222 and the first end portion E1 of the terminal bus bar 272, and the second screw part 244B may fasten the second bus bar 232 and the second end portion E2 of the terminal bus bar 272. Thus, a duplicate description of the same parts will be omitted.

As shown in FIG. 6, the first bus bar 222 and the second bus bar 232 may be indirectly connected to each other via the terminal bus bar 272, rather than being directly connected to each other.

Figure 7A:
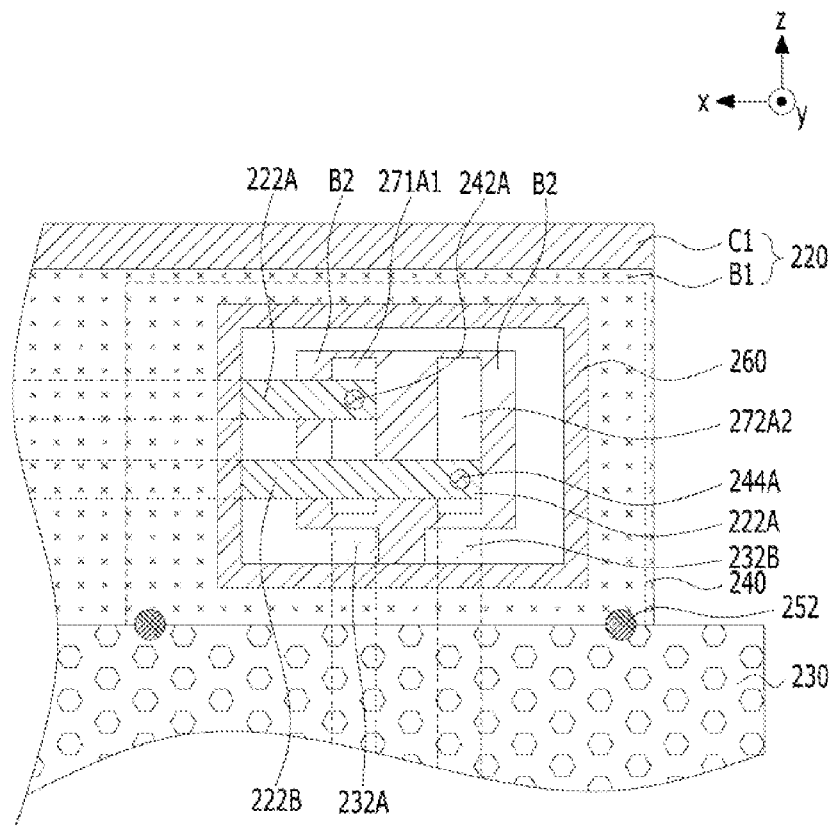
FIGS. 7A to 7C show still another exemplary embodiment of the fuel cell vehicles shown in FIGS. 2A and 2B.
Figure 7B:
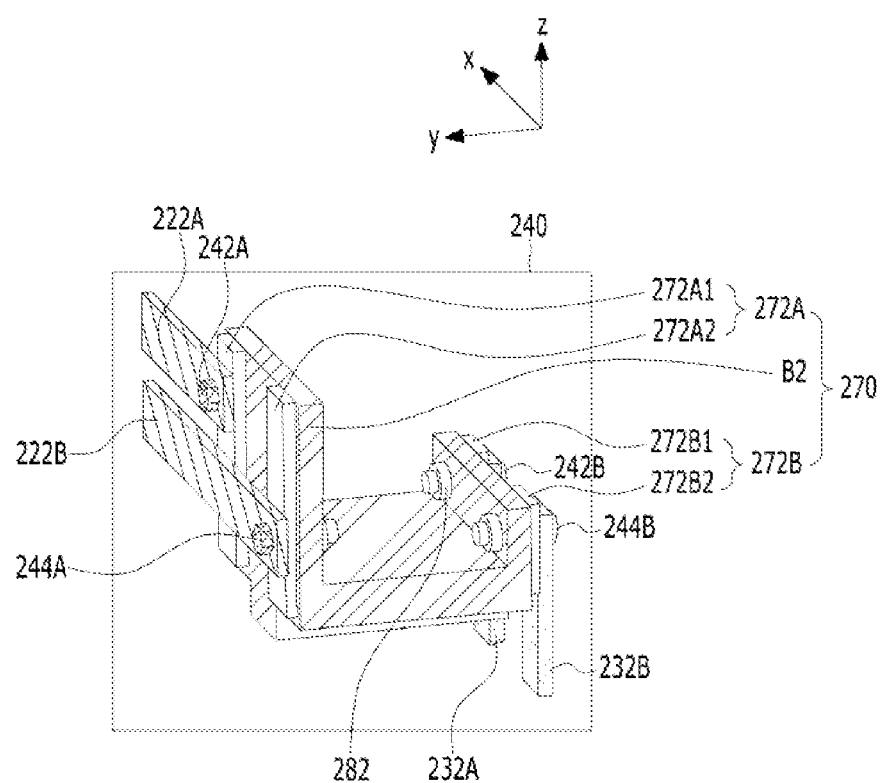
Figure 7C:
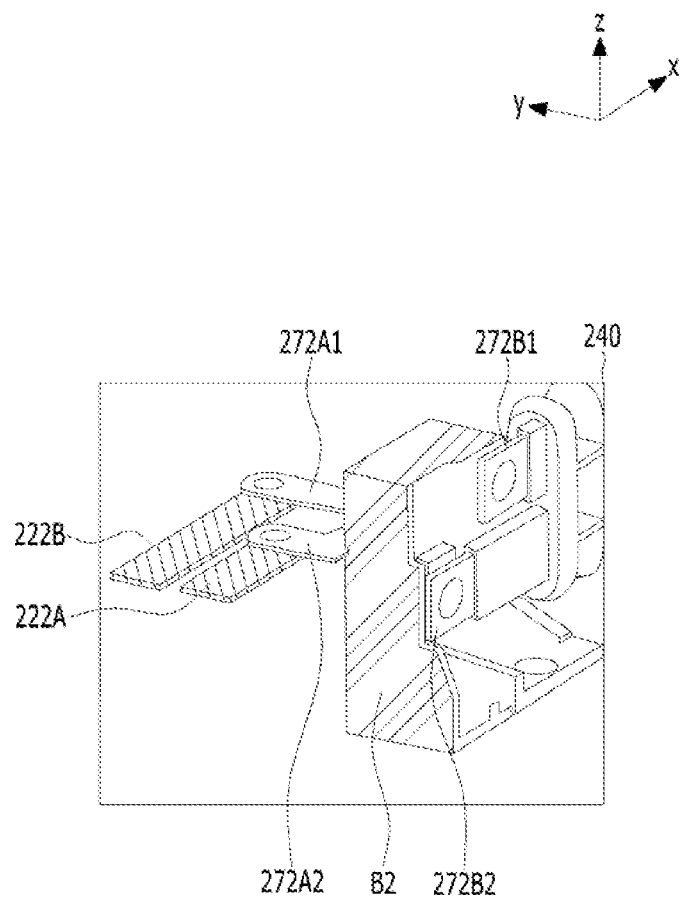

FIGS. 7A to 7C show still another exemplary embodiment of the fuel cell vehicles 200A and 200B shown in FIGS. 2A and 2B. FIG. 7A is a cross-sectional view of the fuel cell vehicle, FIG. 7B is a perspective view showing an exemplary embodiment in which the first bus bars 222A and 222B and second bus bars 232A and 232B are connected to each other via a terminal block 270 in the fastening space 240 shown in FIG. 7A, and FIG. 7C is a perspective view showing another exemplary embodiment in which the first bus bars 222A and 222B and second bus bars 232A and 232B are connected to each other via the terminal block 270 in the fastening space 240.

Unlike the fuel cell vehicle shown in FIG. 5A, the fuel cell vehicle shown in FIG. 7A may further include a terminal block 270. With this exception, since the fuel cell vehicle shown in FIG. 7A is the same as the fuel cell vehicle shown in FIG. 5A, the same parts are denoted by the same reference numerals, a duplicate description thereof will be omitted, and only parts that differ therebetween will be explained.

The first end portion of the terminal bus bar 272 may include a 1-$1^{st}$ terminal bus bar 272A1, which corresponds to a positive terminal, and a 1-$2^{nd}$ terminal bus bar 272A2, which corresponds to a negative terminal. In addition, the second end portion of the terminal bus bar 272 may include a 2-$1^{st}$ terminal bus bar 272B1, which corresponds to a positive terminal, and a 2-$2^{nd}$ terminal bus bar 272B2, which corresponds to a negative terminal. Although not shown, the 1-$1^{st}$ terminal bus bar 272A1 and the 2-$1^{st}$ terminal bus bar 272B1 may be electrically connected to each other via a first connection bus bar embedded in the second body B2, and the 1-$2^{nd}$ terminal bus bar 272A2 and the 2-$2^{nd}$ terminal bus bar 272B2 may be electrically connected to each other via a second connection bus bar embedded in the second body B2. The first fastening member may include a 1-$1^{st}$ screw part 242A and a 1-$2^{nd}$ screw part 244A, and the second fastening member may include a 2-$1^{st}$ screw part 242B and a 2-$2^{nd}$ screw part 244B.

Referring to FIGS. 7A and 7B, the 1-$1^{st}$ screw part 242A passes through the 1-$1^{st}$ bus bar 222A and the 1-$1^{st}$ terminal bus bar 272A1 in the fastening direction (e.g. the y-axis direction) to be threaded with the 1-$1^{st}$ bus bar 222A and the 1-$1^{st}$ terminal bus bar 272A1. The 1-$2^{nd}$ screw part 244A passes through the 1-$2^{nd}$ bus bar 222B and the 1-$2^{nd}$ terminal bus bar 272A2 in the fastening direction (e.g. the y-axis direction) to be threaded with the 1-$2^{nd}$ bus bar 222B and the 1-$2^{nd}$ terminal bus bar 272A2. The 2-$1^{st}$ screw part 242B passes through the 2-$1^{st}$ bus bar 232A and the 2-$1^{st}$ terminal bus bar 272B1 in the fastening direction (e.g. the y-axis direction) to be threaded with the 2-$1^{st}$ bus bar 232A and the 2-$1^{st}$ terminal bus bar 272B1. The 2-$2^{nd}$ screw part 244B passes through the 2-$2^{nd}$ bus bar 232B and the 2-$2^{nd}$ terminal bus bar 272B2 in the fastening direction (e.g. the y-axis direction) to be threaded with the 2-$2^{nd}$ bus bar 232B and the 2-$2^{nd}$ terminal bus bar 272B2.

In FIG. 7C, the form in which the 1-$1^{st}$ and 1-$2^{nd}$ bus bars 222A and 222B are respectively connected to the 1-$1^{st}$ and 1-$2^{nd}$ terminal bus bars 272A1 and 272A2 and the form in which the 2-$1^{st}$ and 2-$2^{nd}$ bus bars 232A and 232B are respectively connected to the 2-$1^{st}$ and 2-$2^{nd}$ terminal bus bars 272B1 and 272B2 are different from those shown in FIG. 7B. However, in FIG. 7C, the configuration in which the first fastening member (not shown) connects the 1-$1^{st}$ and 1-$2^{nd}$ bus bars 222A and 222B and the 1-$1^{st}$ and 1-$2^{nd}$ terminal bus bars 272A1 and 272A2 to each other and the second fastening member (not shown) connects the 2-$1^{st}$ and 2-$2^{nd}$ bus bars 232A and 232B and the 2-$1^{st}$ and 2-$2^{nd}$ terminal bus bars 272B1 and 272B2 to each other is the same as that shown in FIG. 7B.

In particular, as shown in FIGS. 6 and 7B, at least one of the first screw part 244A or the second screw part 244B may be engaged with a weld nut 280. Alternatively, an insert nut 282 may be provided inside the second body C2. As shown in FIGS. 2D and 2E, the fastening space 240 may be located in the interior B3 of the power controller 230.

Figure 8A:
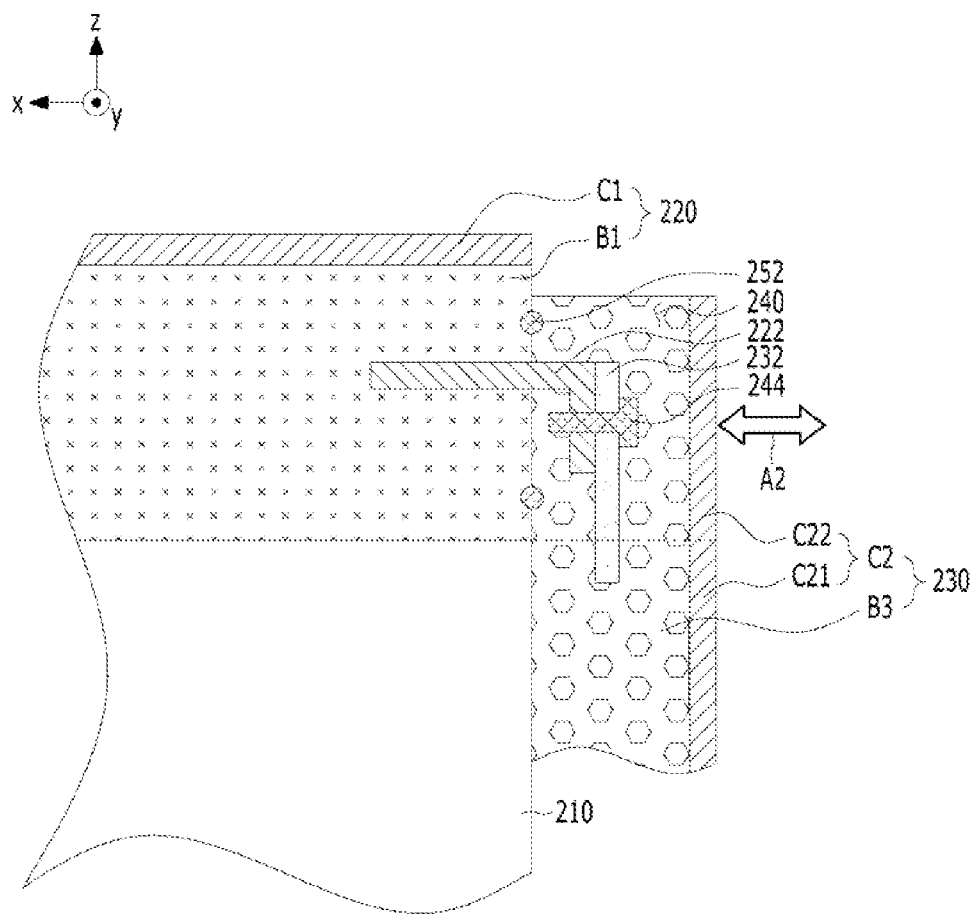
FIGS. 8A and 8B show an exemplary embodiment of the fuel cell vehicle shown in FIG. 2D or 2E.
Figure 8B:
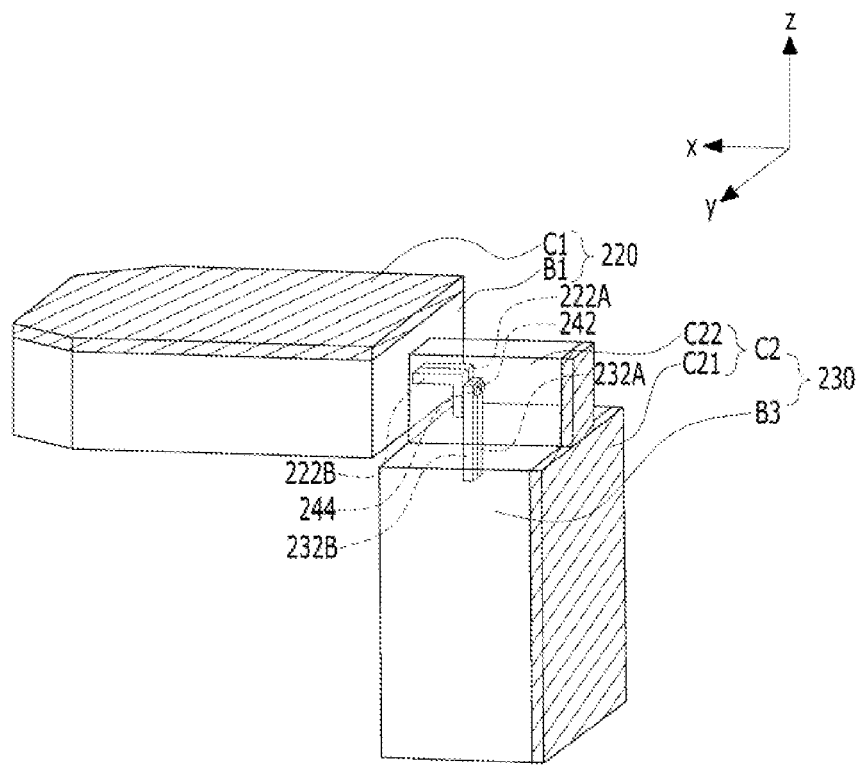

Hereinafter, an exemplary embodiment of the fuel cell vehicles 200D and 200E shown in FIGS. 2D and 2E will be described. FIGS. 8A and 8B show an exemplary embodiment of the fuel cell vehicle 200D or 200E shown in FIG. 2D or 2E. FIG. 8A is a cross-sectional view of the fuel cell vehicle, and FIG. 8B is a view of the fuel cell vehicle 200D or 200E shown in FIG. 2D or 2E, from which the fuel cell 210 is excluded.

In each of the fuel cell vehicles shown in FIGS. 3A to 7B, the fastening space 240 is located in the junction box 220. However, in the fuel cell vehicle shown in FIGS. 8A and 8B, the fastening space 240 is located in the interior B3 of the power controller 230. Further, the fastening direction in each of the fuel cell vehicles shown in FIGS. 3A to 7B is different from that in the fuel cell vehicle shown in FIGS. 8A and 8B. With this exception, since the fuel cell vehicle shown in FIGS. 8A and 8B is the same as the fuel cell vehicle shown in FIG. 3A, the same parts are denoted by the same reference numerals, a duplicate description thereof will be omitted, and only parts that differ therebetween will be explained.

Unlike the fuel cell vehicle shown in FIGS. 3A and 3E, in the fuel cell vehicle shown in FIGS. 8A and 8B, the fastening direction of each of the first and second screw parts 242 and 244 may be the x-axis direction, which is the horizontal direction. The second main cover C2 of the power controller 230 may be opened and closed to form a tool inlet. The second main cover C2 may overlap the fastening space 240 in the fastening direction (e.g. the x-axis direction, that is, the horizontal direction). Referring to FIGS. 8A and 8B, the second main cover C2 may include a third cover portion C21 and a fourth cover portion C22. The third cover portion C21 may overlap the fuel cell 210 in the horizontal direction (e.g. the x-axis direction), and the fourth cover portion C22 may overlap the fastening space 240 in the horizontal direction (e.g. the x-axis direction).

When the openable/closable fourth cover portion C22 of the second main cover C2 is opened in the direction of the arrow A2, the tool inlet may be opened to allow a tool (or a user) to access the fastening space 240 in the fuel cell vehicle from the outside to manipulate the first and second screw parts 242 and 244, which are fastening members, using the tool to fasten the first bus bars 222A and 222B and the second bus bars 232A and 232B.

Figure 9A:
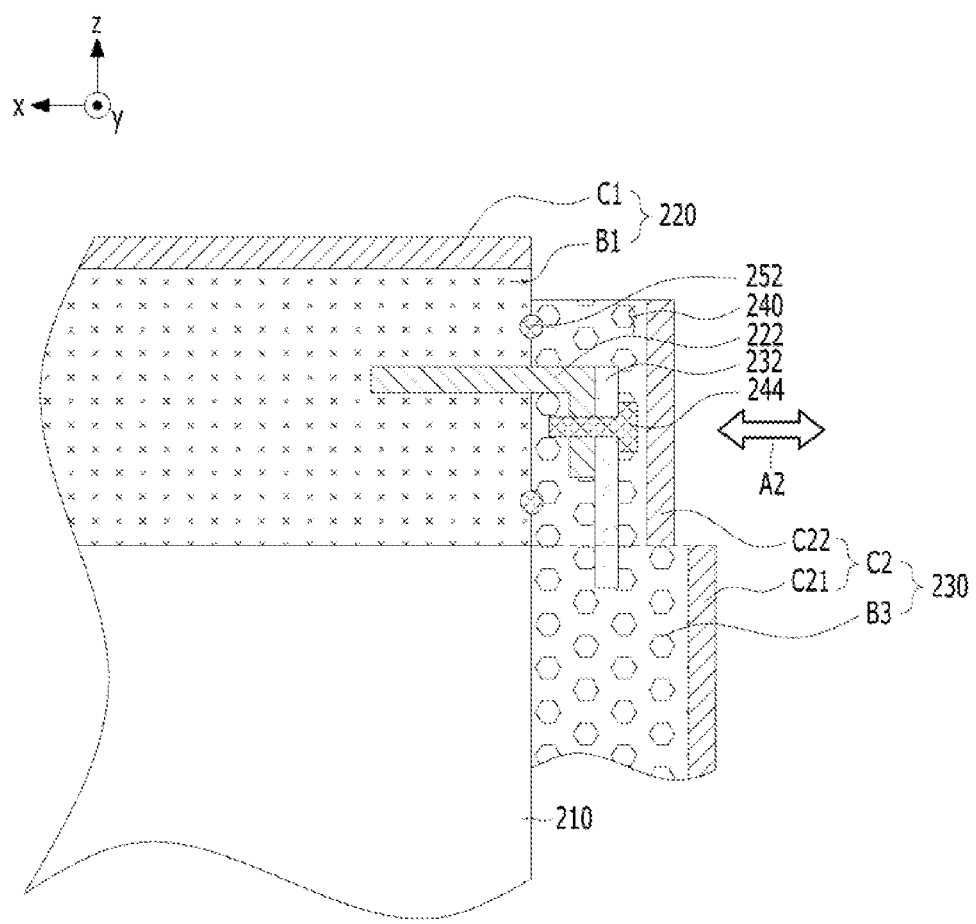
FIGS. 9A and 9B are views showing an exemplary embodiment of the fuel cell vehicle shown in FIG. 2E.
Figure 9B:
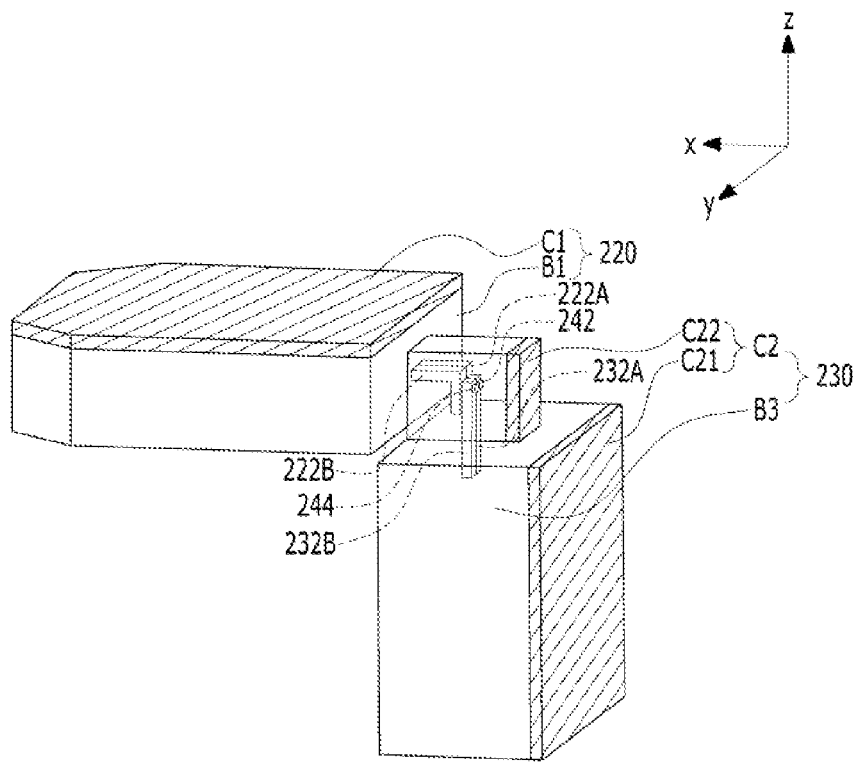

According to an exemplary embodiment, as shown in FIGS. 8A and 8B, the third cover portion C21 and the fourth cover portion C22 may be integrally formed to be opened and closed together. FIGS. 9A and 9B are views showing an exemplary embodiment of the fuel cell vehicle shown in FIG. 2E. Specifically, FIG. 9A is a cross-sectional view of the fuel cell vehicle, and FIG. 9B is a perspective view of the fuel cell vehicle, from which the fuel cell 210 is excluded.

In the fuel cell vehicle shown in FIGS. 8A and 8B, the top surface of the third cover portion C21 of the second main cover C2 and the top surface of the fourth cover portion C22 of the second main cover C2 are located in the same vertical plane. However, in the fuel cell vehicle shown in FIGS. 9A and 9B, the top surface of the third cover portion C21 of the second main cover C2 and the top surface of the fourth cover portion C22 of the second main cover C2 are not located in the same vertical plane. With this exception, since the fuel cell vehicle shown in FIGS. 9A and 9B is the same as the fuel cell vehicle shown in FIGS. 8A and 8B, the same parts are denoted by the same reference numerals, and a duplicate description thereof will be omitted.

Unlike what is shown in FIGS. 8A and 8B, in the fuel cell vehicle shown in FIGS. 9A and 9B, when the openable/closable fourth cover portion C22 of the second main cover C2 is opened in the direction of the arrow A2, the tool inlet may be opened to allow a tool (or a user) to access the fastening space 240 from the outside to fasten the first bus bars 222A and 222B and the second bus bars 232A and 232B.

According to another exemplary embodiment, as shown in FIGS. 9A and 9B, the third cover portion C21 and the fourth cover portion C22 may be opened and closed separately from each other. In other words, when the fourth cover portion C22 is opened in the direction of the arrow A2, the third cover portion C21 may not be opened.

Figure 10:
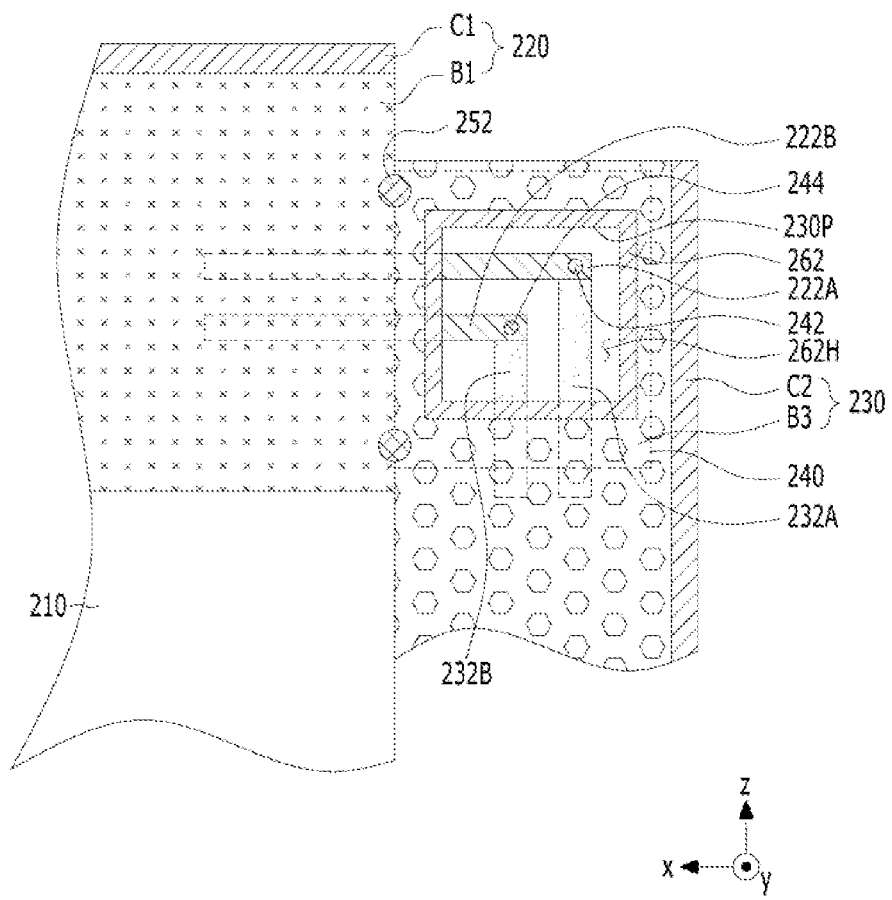
FIG. 10 is a cross-sectional view showing an exemplary embodiment of the fuel cell vehicle shown in FIG. 2D or 2E.

FIG. 10 is a cross-sectional view showing an exemplary embodiment of the fuel cell vehicle 200D or 200E shown in FIG. 2D or 2E. The fuel cell vehicle shown in FIG. 10 may include a fuel cell 210, a junction box 220, and a power controller 230, and may further include a second annular cover 262.

In the fuel cell vehicle shown in FIG. 5A, the fastening space 240 may be located in the junction box 220. However, in the fuel cell vehicle shown in FIG. 10, the fastening space 240 may be located in the interior B3 of the power controller 230. With this exception, since the fuel cell vehicle shown in FIG. 10 is the same as the fuel cell vehicle shown in FIG. 5A, the same parts are denoted by the same reference numerals, a duplicate description thereof will be omitted, and only parts that differ therebetween will be explained.

The fuel cell vehicle shown in FIGS. 8A and 8B does not include a second annular cover 262, whereas the fuel cell vehicle shown in FIG. 10 includes a second annular cover 262. With this exception, since the fuel cell vehicle shown in FIG. 10 is the same as the fuel cell vehicle shown in FIGS. 8A and 8B, the same parts are denoted by the same reference numerals, a duplicate description thereof will be omitted, and only parts that differ therebetween will be explained.

The second annular cover 262 may have a second hollow portion 262H, which overlaps the tool inlet 230P in the power controller 230 in the fastening direction (e.g. the y-axis direction), and may be disposed on the side portion of the power controller 230. In particular, the second hollow portion 262H in the second annular cover 262 and the tool inlet 230P in the power controller 230 may communicate with each other to expose the fastening space 240 to the outside.

In each of the fuel cell vehicles shown in FIGS. 8A and 8B and in FIGS. 9A and 9B, the fourth cover C22 may be opened in the direction of the arrow A2 to open the tool inlet, thereby allowing access by a tool (or a user) to the fastening space 240 from the outside.

In contrast, in the fuel cell vehicle shown in FIG. 10, the fastening space 240 may be exposed to the outside by communication between the tool inlet 230P and the second hollow portion 262H, thereby allowing access by a user (or a tool) to the fastening space 240 from the outside. In other words, it is possible to enable access to the fastening space 240 from the outside without opening the fourth cover C22.

In each of the fuel cell vehicles shown in FIGS. 8A and 8B and in FIGS. 9A and 9B, since the fastening members 242 and 244 fasten the first bus bars 222A and 222B and the second bus bars 232A and 232B in the x-axis direction, the fastening direction is the x-axis direction. In contrast, in the fuel cell vehicle shown in FIG. 10, since the fastening members 242 and 244 fasten the first bus bars 222A and 222B and the second bus bars 232A and 232B in the y-axis direction, the fastening direction is the y-axis direction.

Each of the fuel cell vehicles shown in FIGS. 8A and 8B and in FIGS. 9A and 9B may include a first sealing member 252. The first sealing member 252 may be disposed at a contact portion between the junction box 220 and the power controller 230. Although disposed at different positions from each other, the first sealing member 252 of each of the fuel cell vehicles shown in FIGS. 8A and 8B and in FIGS. 9A and 9B and the first sealing member 252 shown in FIG. 3C have the same shape and perform the same function as each other, and thus a description of the first sealing member 252 will be omitted.

Unlike the fuel cell vehicles shown in FIGS. 8A and 8B and in FIGS. 9A and 9B, the fuel cell vehicle shown in FIG. 10 may include a first sealing member 252 and a third sealing member (not shown). The second sealing member 254 shown in FIG. 5C may be disposed between the junction box 220 and the first annular cover 260, whereas the third sealing member may be disposed between the power controller 230 and the second annular cover 262. With this exception, the third sealing member has the same shape as the second sealing member 254.

The second annular cover 262 may have the same shape as the first annular cover 260 shown in FIG. 5C. Accordingly, the third sealing member may be disposed at a contact portion between the second annular cover 262 and the side portion of the power controller 230 to surround the second hollow portion 262H. The third sealing member may be disposed at a contact portion between the power controller 230 and the second annular cover 262, thereby sealing the second annular cover 262 and the power controller 230 from the outside.

In each of the fuel cell vehicles shown in FIGS. 8A, 8B, 9A, 9B and 10, the fastening members 242 and 244 directly fasten the first bus bars 222A and 222B and the second bus bars 232A and 232B. According to another exemplary embodiment, the fastening members may indirectly fasten the first bus bars 222A and 222B and the second bus bars 232A and 232B via a terminal block. A fuel cell vehicle according to this exemplary embodiment will be described below with reference to the accompanying drawings.

Figure 11:
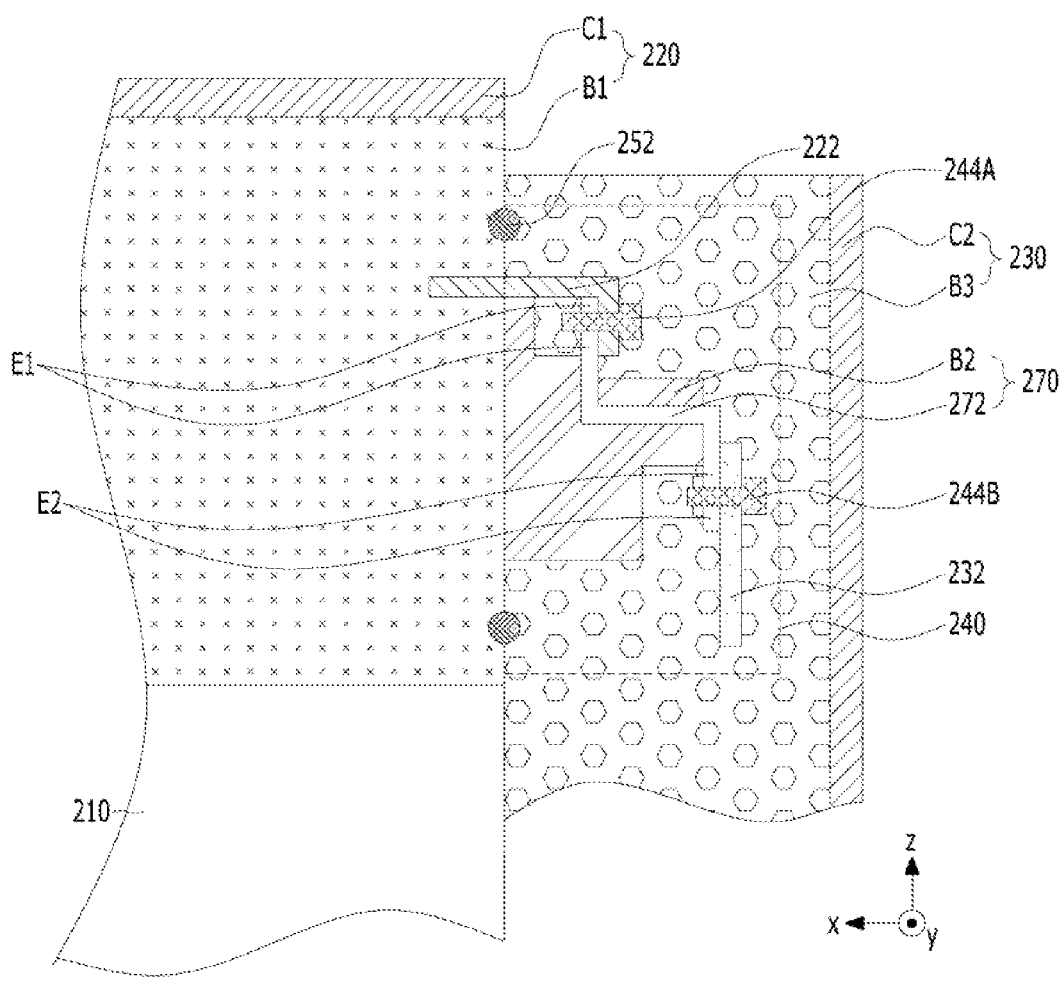
FIG. 11 is a cross-sectional view showing still another exemplary embodiment of the fuel cell vehicle shown in FIG. 2D.

FIG. 11 is a cross-sectional view showing still another exemplary embodiment of the fuel cell vehicle 200E shown in FIG. 2D. The fastening part shown in FIG. 11 may include a terminal block 270, a first fastening member, and a second fastening member.

Unlike the fuel cell vehicle shown in FIGS. 8A and 8B, the fastening part of the fuel cell vehicle shown in FIG. 11 may further include a terminal block 270. With this exception, since the fuel cell vehicle shown in FIG. 11 is the same as the fuel cell vehicle shown in FIGS. 8A and 8B, the same parts are denoted by the same reference numerals, a duplicate description thereof will be omitted, and only parts that differ therebetween will be explained.

In the fuel cell vehicle shown in FIG. 6, the fastening space 240 may be located in the junction box 220. However, in the fuel cell vehicle shown in FIG. 11, the fastening space 240 may be located in the interior B3 of the power controller 230. Accordingly, the fuel cell vehicle shown in FIG. 6 is structured such that the terminal block 270 may be located in the junction box 220, whereas the fuel cell vehicle shown in FIG. 11 is structured such that the terminal block 270 may be located in the interior B3 of the power controller 230. Further, the fastening direction in the fuel cell vehicle shown in FIG. 6 is different from that in the fuel cell vehicle shown in FIG. 11. With this exception, since the fuel cell vehicle shown in FIG. 11 is the same as the fuel cell vehicle shown in FIG. 6, the same parts are denoted by the same reference numerals, a duplicate description thereof will be omitted, and only parts that differ therebetween will be explained.

The terminal block 270 may be connected to the junction box 220, and may protrude from the junction box 220 toward the power controller 230 in the horizontal direction. The terminal block 270 may include a second body B2 and a terminal bus bar 272. The first fastening member may directly fasten the first bus bar 222 and the first end portion E1 of the terminal bus bar 272, and the second fastening member may directly fasten the second bus bar 232 and the second end portion E2 of the terminal bus bar 272.

A first screw part 244A, which is the first fastening member, may pass through the first bus bar 222 and the first end portion E1 of the terminal bus bar 272 in the fastening direction (e.g. the x-axis direction) to be threaded with the first bus bar 222 and the first end portion E1 of the terminal bus bar 272. A second screw part 244B, which is the second fastening member, may pass through the second bus bar 232 and the second end portion E2 of the terminal bus bar 272 in the fastening direction (e.g. the x-axis direction) to be threaded with the second bus bar 232 and the second end portion E2 of the terminal bus bar 272.

In the same method as the method in which the first and second screw parts 242 and 244 shown in FIG. 3D fasten the first bus bars 222A and 222B and the second bus bars 232A and 232B in a screw-coupling manner, the first screw part 244A may fasten the first bus bar 222 and the first end portion E1 of the terminal bus bar 272 in a screw-coupling manner, and the second screw part 244B may fasten the second bus bar 232 and the second end portion E2 of the terminal bus bar 272 in a screw-coupling manner. Thus, a duplicate description of the same parts will be omitted. As described above, the first bus bar 222 and the second bus bar 232 may be indirectly connected to each other via the terminal bus bar 272, rather than being directly connected to each other.

Figure 12:
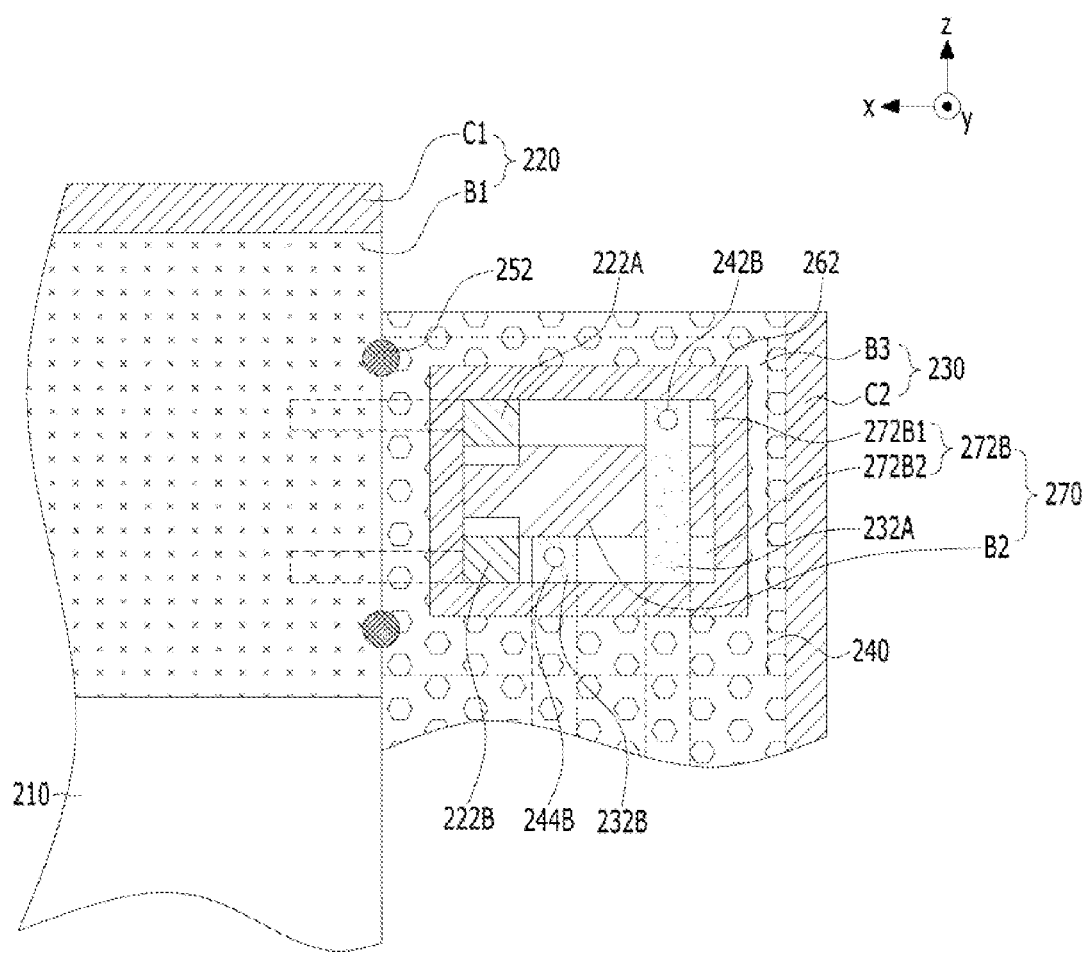
FIG. 12 is a cross-sectional view showing still another exemplary embodiment of the fuel cell vehicle shown in FIG. 2D.

FIG. 12 is a cross-sectional view showing still another exemplary embodiment of the fuel cell vehicle 200D shown in FIG. 2D. Unlike the fuel cell vehicle shown in FIG. 11, the fuel cell vehicle shown in FIG. 12 may further include a second annular cover 262. Further, the fastening direction in the fuel cell vehicle shown in FIG. 11 and the fastening direction in the fuel cell vehicle shown in FIG. 12 are different from each other. With this exception, since the fuel cell vehicle shown in FIG. 12 is the same as the fuel cell vehicle shown in FIG. 11, the same parts are denoted by the same reference numerals, a duplicate description thereof will be omitted, and only parts that differ therebetween will be explained.

In the fuel cell vehicle shown in FIGS. 7A and 7B, the fastening space 240 may be located in the junction box 220. However, in the fuel cell vehicle shown in FIG. 12, the fastening space 240 may be located in the interior B3 of the power controller 230. With this exception, since the fuel cell vehicle shown in FIG. 12 is the same as the fuel cell vehicle shown in FIGS. 7A and 7B, the same parts are denoted by the same reference numerals, a duplicate description thereof will be omitted, and only parts that differ therebetween will be explained.

The second terminal bus bar 272B shown in FIG. 12 may include a 2-$1^{st}$ terminal bus bar 272B1 and a 2-$2^{nd}$ terminal bus bar 272B2. In particular, the 2-$1^{st}$ terminal bus bar 272B1 and the 2-$2^{nd}$ terminal bus bar 272B2 respectively correspond to the 2-$1^{st}$ terminal bus bar 272B1 and the 2-$2^{nd}$ terminal bus bar 272B2 shown in FIGS. 7A and 7B.

Although not shown, the terminal bus bar 272 shown in FIG. 12 may further include a first terminal bus bar 272A. The first terminal bus bar may include a 1-$1^{st}$ terminal bus bar and a 1-$2^{nd}$ terminal bus bar, which respectively correspond to the 1-$1^{st}$ terminal bus bar 272A1 and the 1-$2^{nd}$ terminal bus bar 272A2 shown in FIGS. 7A and 7B.

The fastening part shown in FIG. 12 may include first and second fastening members, and the second fastening member may include a 2-$1^{st}$ screw part 242B and a 2-$2^{nd}$ screw part 244B. The 2-$1^{st}$ screw part 242B and the 2-$2^{nd}$ screw part 244B shown in FIG. 12 respectively correspond to the 2-$1^{st}$ screw part 242B and the 2-$2^{nd}$ screw part 244B shown in FIGS. 7A and 7B. Although not shown, the first fastening member shown in FIG. 12 may include a 1-$1^{st}$ screw part 242A and a 1-$2^{nd}$ screw part 244A, as shown in FIGS. 7A and 7B.

For parts that are not shown in FIG. 12 or are not described in detail, reference may be made to the description of the parts shown in FIGS. 7A and 7B. For example, the description of the 1-$1^{st}$ screw part 242A, the 1-$2^{nd}$ screw part 244A, the 2-$1^{st}$ screw part 242B, and the 2-$2^{nd}$ screw part 244B of the fuel cell vehicle shown in FIGS. 7A and 7B may also apply to the fuel cell vehicle shown in FIG. 12.

Figure 13:
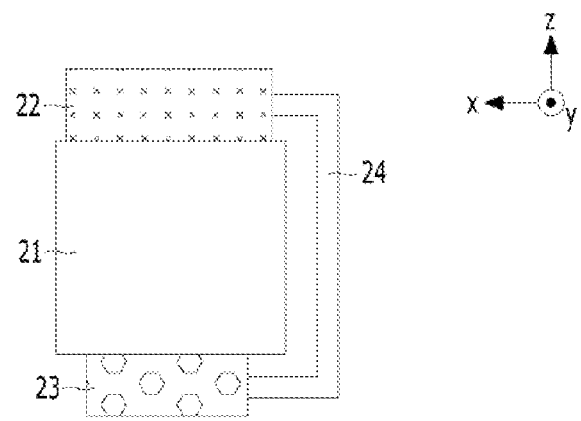
FIG. 13 is a partial side view of a fuel cell vehicle according to a first comparative example.

Hereinafter, a fuel cell vehicle according to a comparative example and the fuel cell vehicle according to the exemplary embodiment will be described with reference to the accompanying drawings. FIG. 13 is a partial side view of a fuel cell vehicle according to a first comparative example, which includes a fuel cell 21, a junction box 22, a power controller 23, a connector, and a wire 24. The fuel cell 21, the junction box 22, and the power controller 23 respectively perform the same functions as the fuel cell 210, the junction box 220, and the power controller 230 according to the exemplary embodiment, and thus a duplicate description thereof will be omitted.

In the case of the first comparative example, the junction box 22, which is located on the fuel cell 21, and the power controller 23, which is located under the fuel cell 21, may be connected to each other via the connector and the wire 24. However, in the case of the first comparative example, when driving parts, such as a motor speed reducer and a drive shaft, are disposed under the fuel cell 21, the space under the fuel cell 21 may be insufficient to accommodate the power controller 23 therein.

Further, since it is necessary to secure space in which to dispose the connector and wire 24, the design for arrangement of the fuel cell 21, the junction box 22, and the power controller 23 becomes complicated. Furthermore, since it is necessary to secure space for installation and removal of the connector and the wire 24, freedom of design is limited, space utilization is deteriorated, and the process of manufacturing a fuel cell vehicle becomes complicated, resulting in an increase in manufacturing costs.

Figure 14:
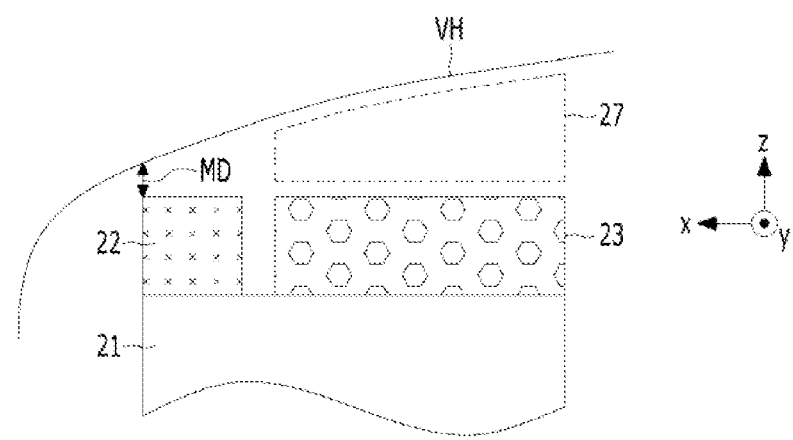
FIG. 14 is a partial side view of a fuel cell vehicle according to a second comparative example.

FIG. 14 is a partial side view of a fuel cell vehicle according to a second comparative example, which includes a fuel cell 21, a junction box 22, a power controller 23, and a hood VH. The fuel cell 21, the junction box 22, and the power controller 23 respectively perform the same functions as the fuel cell 210, the junction box 220, and the power controller 230 according to the exemplary embodiment, and thus a duplicate description thereof will be omitted.

In the case of the second comparative example, the junction box 22 and the power controller 23 are disposed on the fuel cell 21. Therefore, when the junction box 22 and the power controller 23 are directly connected to each other by a bus bar, the connector and the wiring 24 provided in the first comparative example are not required.

However, as the minimum distance MD that the hood VH and the junction box 22 are spaced apart from each other in the z-axis direction, which is the vertical direction, decreases, the impact applied to a pedestrian who collides with a vehicle may increase. Further, when the minimum distance MD is not sufficient, it may be impossible to dispose the junction box 22 and the power controller 23 on the fuel cell 21. Thus, the second comparative example shown in FIG. 14 may apply to a commercial vehicle having a profile different from that of the hood VH. However, the second comparative example may be difficult to apply to a vehicle in which the profile of the hood VH is gradually lowered in a direction approaching the front of the vehicle, that is, the minimum distance MD gradually decreases in a direction approaching the front of the vehicle. Further, a useless space 27 may be formed in the fuel cell vehicle according to the second comparative example, so space utilization may be deteriorated.

In contrast, in the fuel cell vehicle according to the exemplary embodiment, the junction box 220 may be disposed on the fuel cell 210, the power controller 230 may be disposed at the rear side of the fuel cell 210, and the first bus bar and the second bus bar may be fastened to each other by the fastening part in the fastening space 240, which is located in the junction box 220 or the power controller 230. Thus, the connector and the wire 24 shown in FIG. 13 are not required. Accordingly, compared to the first comparative example, the fuel cell vehicle according to the exemplary embodiment is advantageous in that connection between the first bus bar and the second bus bar is simplified, the volume of the fuel cell vehicle is minimal, efficiency of power transfer between the junction box 220 and the power controller 230 is improved, the design of the fuel cell vehicle is simplified, the cost of manufacturing the fuel cell vehicle is reduced, and the process of manufacturing the fuel cell vehicle is simplified.

In addition, unlike the first comparative example, in which the power controller 23 is disposed under the fuel cell 21, the fuel cell vehicle according to the exemplary embodiment is structured such that the power controller 230 is disposed at the rear side of the fuel cell 210, rather than under the fuel cell 210, thereby improving utilization of space under the fuel cell 210. In addition, unlike what is shown in FIG. 14, the fuel cell vehicle according to the exemplary embodiment is not restricted with regard to the minimum distance MD, and is thus advantageously applied to a structure in which the profile of the hood VH is low. Accordingly, the exemplary embodiment is capable of being applied to a vehicle, and a useless space 27 is not formed, whereby space utilization is improved.

In addition, when the fuel cell vehicle according to the exemplary embodiment has the configuration shown in FIG. 2C, the horizontal spacing distance from the rear surface of the power controller 230 to a cowl panel CA decreases, thus making it possible to prevent deformation of the cowl panel CA in the event of a collision of the vehicle. As described above, the exemplary embodiment exhibits the advantages of the first and second comparative examples, and solves the problems with the first and second comparative examples.

In addition, each of the fuel cell vehicles shown in FIGS. 5A, 7A, 10 and 12 requires not only the first sealing member 252 but also the second sealing member 254, whereas each of the fuel cell vehicles shown in FIGS. 3, 4A, 6, 8A, 9A and 11 requires only the first sealing member 252 but does not require the second sealing member 254, thus exhibiting improved efficiency of assembly and airtightness, reduced manufacturing cost, and a simplified manufacturing process. In addition, each of the fuel cell vehicles shown in FIGS. 3, 4A, 6, 8A, 9A and 11 requires a tool to manipulate the fastening part, whereas each of the fuel cell vehicles shown in FIGS. 5A, 7A, 10 and 12 enables a user to manually manipulate the fastening part without requiring a tool, which is advantageous from the aspect of maintenance and repair.

As is apparent from the above description, the fuel cell vehicle according to the exemplary embodiment is advantageous in that connection between the first bus bar and the second bus bar is simplified, efficiency of power transfer is improved, the volume of the fuel cell vehicle is minimal, the design of the fuel cell vehicle is simplified, the cost of manufacturing the fuel cell vehicle is reduced, the process of manufacturing the fuel cell vehicle is simplified, and efficiency of utilization of space under the fuel cell is improved. In addition, the exemplary embodiment is capable of being applied to a vehicle, and a useless or unnecessary space is not formed under a hood, whereby space utilization is improved. In addition, it may be possible to prevent deformation of a cowl panel during a collision of the vehicle. In addition, the exemplary embodiment exhibits improved efficiency of assembly and airtightness, and facilitates maintenance and repair.

However, the effects achievable through the disclosure are not limited to the above-mentioned effects, and other effects not mentioned herein will be clearly understood by those skilled in the art from the above description. The above-described various embodiments may be combined with each other without departing from the scope of the present disclosure unless they are incompatible with each other. In addition, for any element or process that is not described in detail in any of the various embodiments, reference may be made to the description of an element or a process having the same reference numeral in another exemplary embodiment, unless otherwise specified.

While the present disclosure has been particularly shown and described with reference to exemplary embodiments thereof, these exemplary embodiments are only proposed for illustrative purposes, and do not restrict the present disclosure, and it will be apparent to those skilled in the art that various changes in form and detail may be made without departing from the essential characteristics of the exemplary embodiments set forth herein. For example, respective configurations set forth in the exemplary embodiments may be modified and applied. Further, differences in such modifications and applications should be construed as falling within the scope of the present disclosure as defined by the appended claims.

What is claimed is:

1. A fuel cell vehicle, comprising:
   a fuel cell;
   a junction box disposed on the fuel cell, the junction box including a first bus bar;
   a power controller disposed at a rear side of the fuel cell, the power controller including a second bus bar; and
   a fastening part configured to fasten the first bus bar and the second bus bar in a fastening space to electrically connect the junction box and the power controller to each other,
   wherein one of the junction box and the power controller includes a tool inlet to allow access to the fastening space from an outside, and
   wherein a terminal block is connected to the power controller and protrudes to an inside of the junction box.

2. The fuel cell vehicle according to claim 1, wherein the fastening part includes a fastening member configured to directly fasten the first bus bar and the second bus bar.

3. The fuel cell vehicle according to claim 2, wherein the fastening member includes screw parts passing through the first bus bar and the second bus bar in a fastening direction to be threaded with the first bus bar and the second bus bar, respectively.

4. The fuel cell vehicle according to claim 1, wherein the fastening part includes:
   the terminal block having a terminal bus bar, the terminal bus bar includes a first end portion, connected to the first bus bar, and a second end portion, connected to the second bus bar;
   a first fastening member configured to directly fasten the first bus bar and the first end portion of the terminal bus bar; and
   a second fastening member configured to directly fasten the second bus bar and the second end portion of the terminal bus bar.

5. The fuel cell vehicle according to claim 4, wherein:
   the first fastening member includes a first screw part passing through the first bus bar and the first end portion of the terminal bus bar in a fastening direction to be threaded with the first bus bar and the first end portion of the terminal bus bar, and
   the second fastening member includes a second screw part passing through the second bus bar and the second end portion of the terminal bus bar in the fastening direction to be threaded with the second bus bar and the second end portion of the terminal bus bar.

6. The fuel cell vehicle according to claim 1, wherein the tool inlet overlaps the fastening space in a fastening direction.

7. The fuel cell vehicle according to claim 6, wherein the junction box includes the fastening space and the tool inlet, and wherein the second bus bar protrudes from the power controller to the inside of the junction box.

8. The fuel cell vehicle according to claim 7, wherein the fastening space overlaps the power controller in a vertical direction.

9. The fuel cell vehicle according to claim 7, wherein the junction box is configured to be openable and closable to form the tool inlet, and includes a first main cover overlapping the fastening space in the fastening direction.

10. The fuel cell vehicle according to claim 9, wherein the first main cover includes:
    a first cover portion overlapping the fuel cell in a vertical direction; and
    a second cover portion overlapping the fastening space in the vertical direction.

11. The fuel cell vehicle according to claim 10, wherein the first cover portion and the second cover portion are integrally formed to be opened and closed together.

12. The fuel cell vehicle according to claim 10, wherein the first cover portion and the second cover portion are formed to be opened and closed separately from each other.

13. The fuel cell vehicle according to claim 7, further comprising:
    a first annular cover including a first hollow portion overlapping the tool inlet in the junction box in the fastening direction, the first annular cover being disposed on a side portion of the junction box,
    wherein the first hollow portion and the tool inlet communicate with each other to expose the fastening space.

14. The fuel cell vehicle according to claim 6, wherein the power controller includes the fastening space and the tool inlet, wherein the first bus bar protrudes from the junction box to an inside of the power controller, and wherein the terminal block is connected to the junction box and protrudes to the inside of the power controller.

15. The fuel cell vehicle according to claim 14, wherein the fastening space overlaps the junction box in a horizontal direction.

16. The fuel cell vehicle according to claim 14, wherein the power controller is configured to be openable and closable to form the tool inlet, and includes a second main cover overlapping the fastening space in the fastening direction.

17. The fuel cell vehicle according to claim 16, wherein the second main cover includes:
    a third cover portion overlapping the fuel cell in a horizontal direction; and
    a fourth cover portion overlapping the fastening space in the horizontal direction.

18. The fuel cell vehicle according to claim 17, wherein the third cover portion and the fourth cover portion are integrally formed to be opened and closed together.

19. The fuel cell vehicle according to claim 17, wherein the third cover portion and the fourth cover portion are formed to be opened and closed separately from each other.

20. The fuel cell vehicle according to claim 14, further comprising:
    a second annular cover including a second hollow portion overlapping the tool inlet in the power controller in the fastening direction, the second annular cover being disposed on a side portion of the power controller, wherein the second hollow portion and the tool inlet communicate with each other to expose the fastening space.

* * * * *